(12) United States Patent
Kurita et al.

(10) Patent No.: US 11,942,751 B2
(45) Date of Patent: Mar. 26, 2024

(54) LASER DEVICE

(71) Applicant: HAMAMATSU PHOTONICS K.K., Hamamatsu (JP)

(72) Inventors: Takashi Kurita, Hamamatsu (JP); Ryo Yoshimura, Hamamatsu (JP); Ryo Makino, Hamamatsu (JP); Yuu Takiguchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 18/032,403

(22) PCT Filed: Sep. 29, 2021

(86) PCT No.: PCT/JP2021/035955
§ 371 (c)(1),
(2) Date: Apr. 18, 2023

(87) PCT Pub. No.: WO2022/085385
PCT Pub. Date: Apr. 28, 2022

(65) Prior Publication Data
US 2024/0030672 A1  Jan. 25, 2024

(30) Foreign Application Priority Data
Oct. 23, 2020 (JP) .................. 2020-178067

(51) Int. Cl.
*H01S 3/00* (2006.01)
*B23K 26/064* (2014.01)
(Continued)

(52) U.S. Cl.
CPC .......... *H01S 3/0085* (2013.01); *B23K 26/064* (2015.10); *G02F 1/0136* (2013.01);
(Continued)

(58) Field of Classification Search
CPC ...................................................... H01S 3/0085
See application file for complete search history.

(56) References Cited

U.S. PATENT DOCUMENTS

2019/0389002 A1* 12/2019 Xiang .................. B23K 26/083
2020/0070280 A1*  3/2020 Gauch ................ B23K 26/0673
2020/0238896 A1*  7/2020 Pang ..................... F21S 41/125

FOREIGN PATENT DOCUMENTS

JP        2002-540448 A      11/2002
JP        2005-266585 A       9/2005
(Continued)

OTHER PUBLICATIONS

International Preliminary Report on Patentability dated May 4, 2023 for PCT/JP2021/035955.

(Continued)

*Primary Examiner* — Edmond C Lau
(74) *Attorney, Agent, or Firm* — Faegre Drinker Biddle & Reath LLP

(57) ABSTRACT

Disclosed is a laser device including: a laser light source configured to emit laser light; a phase control unit configured to receive the laser light emitted from the laser light source, to control a spatial phase of a portion of the laser light, to emit the portion of the light as control light, and to emit another portion of the laser light as non-control light; a first optical system configured to irradiate an object with the control light emitted from the phase control unit; a detector configured to detect the non-control light emitted from the phase control unit; a second optical system configured to cause the non-control light emitted from the phase control unit to converge toward a detection surface of the detector.

7 Claims, 20 Drawing Sheets

(51) Int. Cl.
      *G02F 1/01*           (2006.01)
      *G02F 1/133*         (2006.01)
      *G02F 1/137*         (2006.01)

(52) U.S. Cl.
      CPC .......... *G02F 1/13318* (2013.01); *G02F 1/137* (2013.01); *H01S 3/0014* (2013.01)

(56) References Cited

FOREIGN PATENT DOCUMENTS

| | | |
|---|---|---|
| JP | 2006-119427 A | 5/2006 |
| JP | 2009-192832 A | 8/2009 |
| JP | 2014-026194 A | 2/2014 |
| JP | 2014-095863 A | 5/2014 |
| JP | 2015-223620 A | 12/2015 |
| JP | 2015-226012 A | 12/2015 |
| JP | 2020-040072 A | 3/2020 |
| WO | WO-00/057217 A1 | 9/2000 |
| WO | WO-2013/153371 A1 | 10/2013 |

OTHER PUBLICATIONS

Hasegawa, Satoshi et al., "Holographic femtosecond laser processing with multiplexed phase Fresnel lenses," Optics Letters, Jun. 1, 2006, vol. 31, No. 11, pp. 1705-1707.

\* cited by examiner

Fig.6
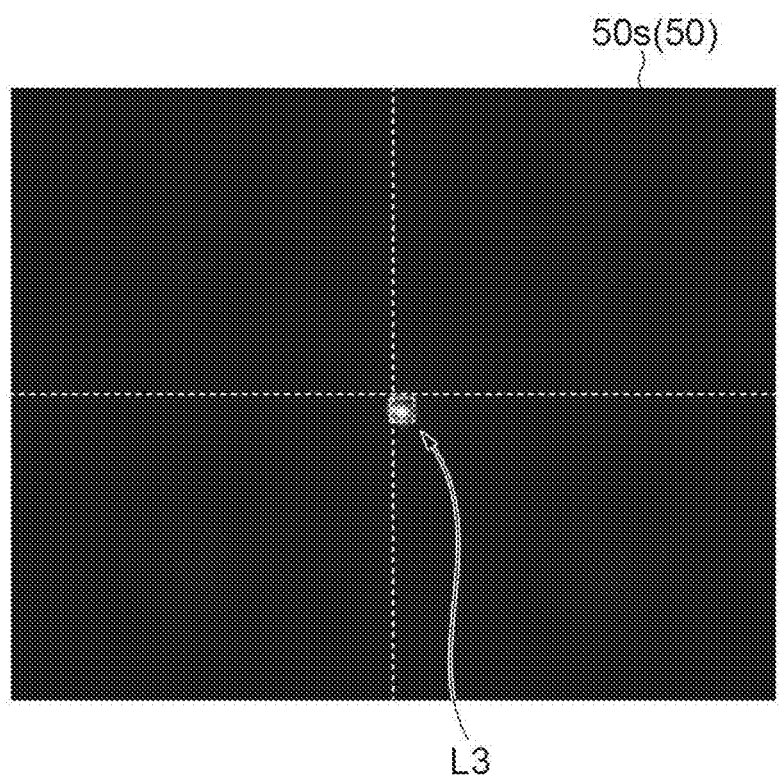
(a)
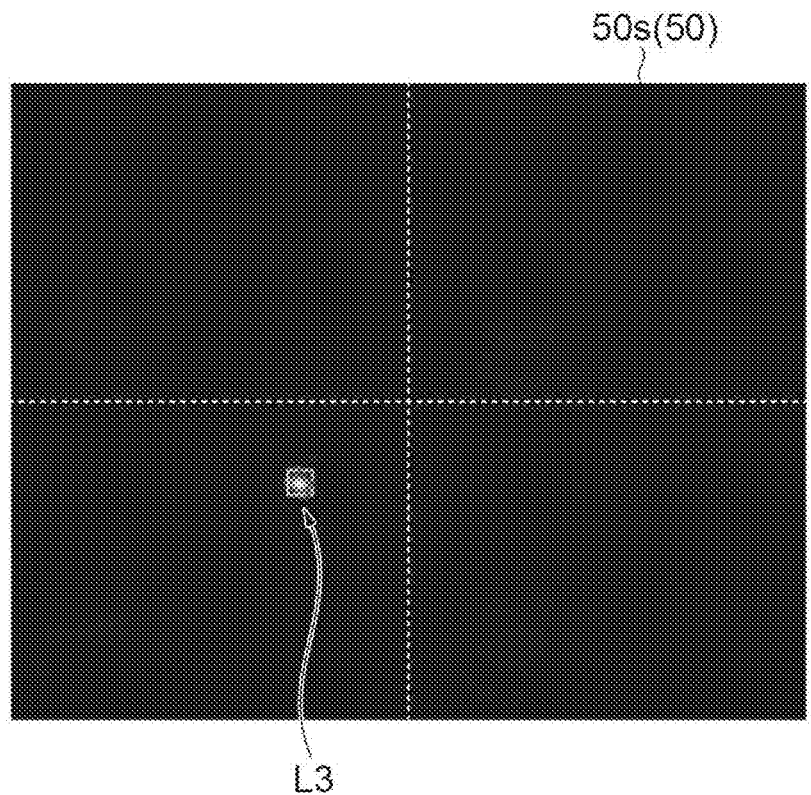
(b)

Fig.7
(a)
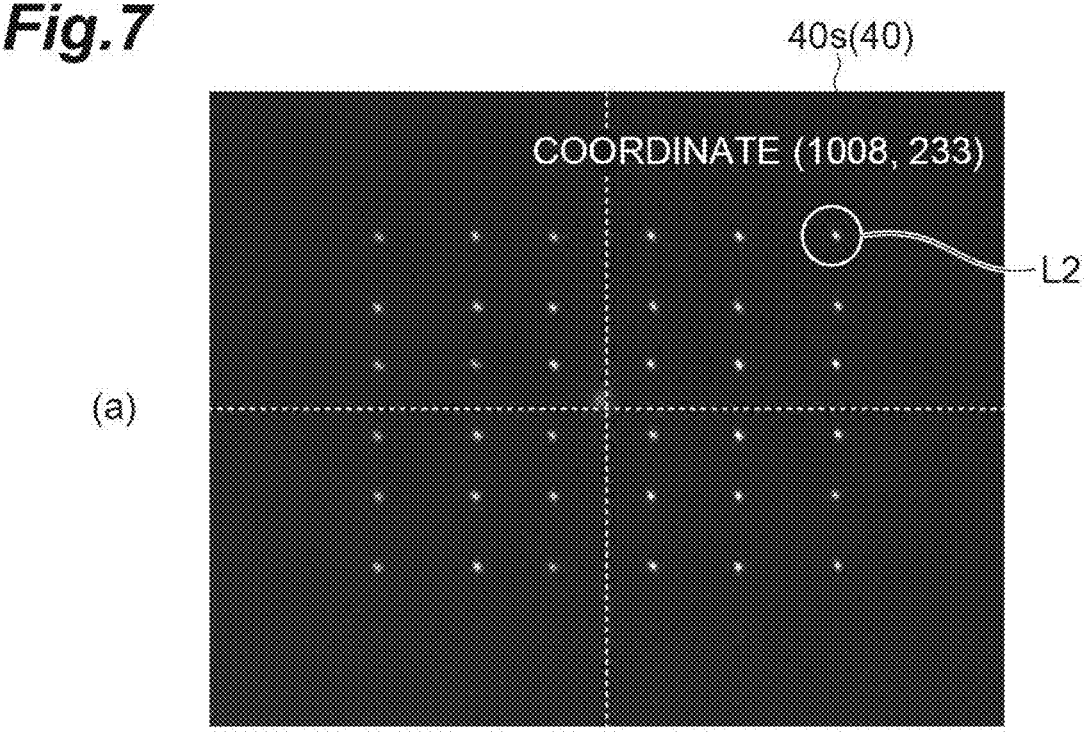
(b)
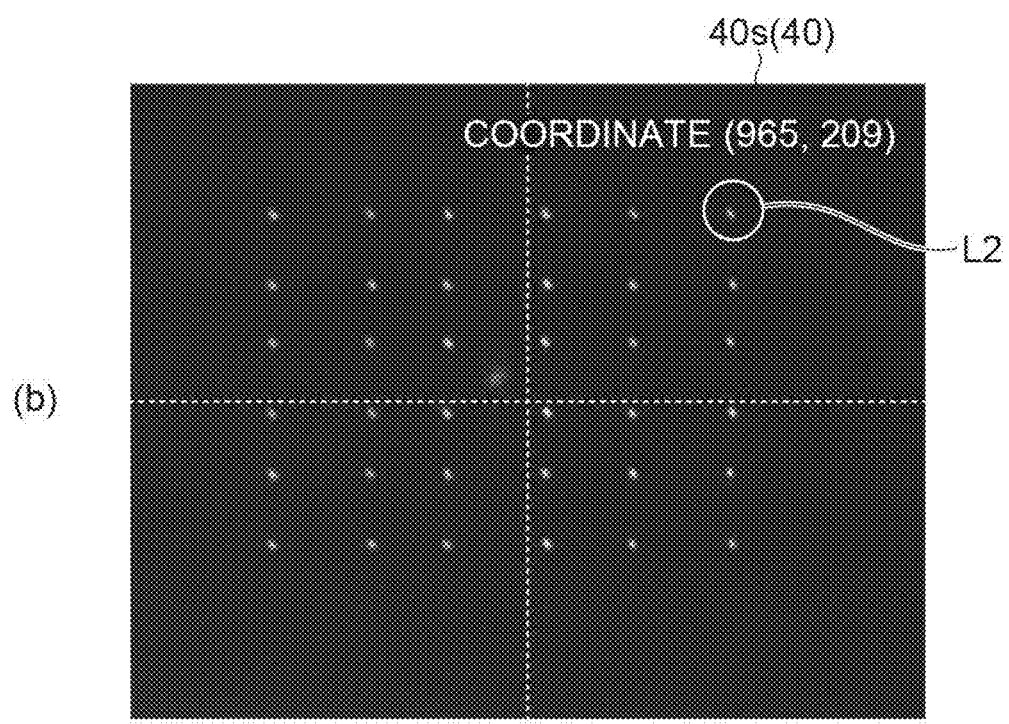

*Fig.8*
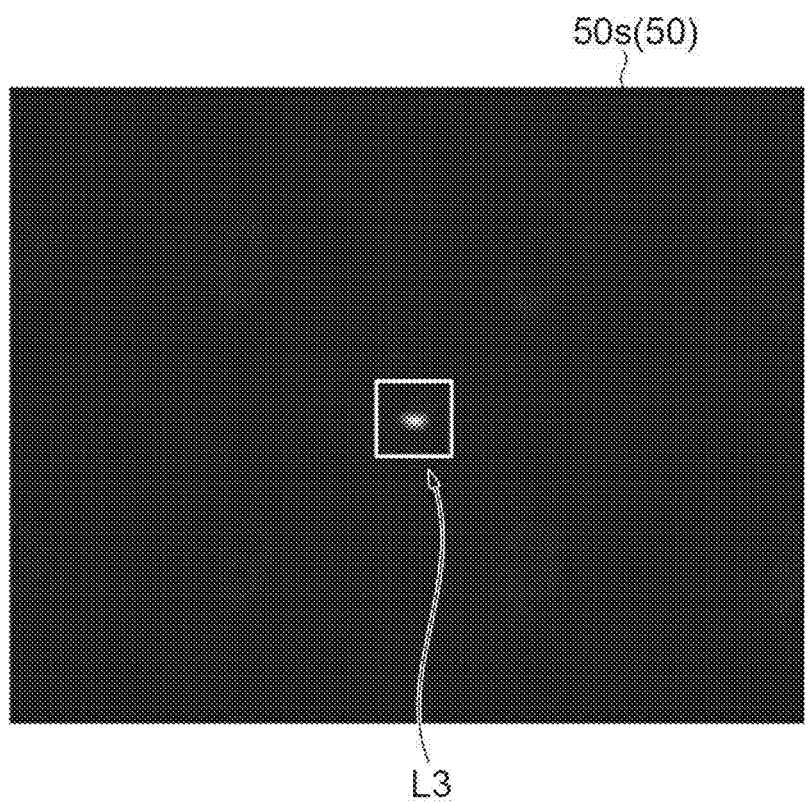
(a)
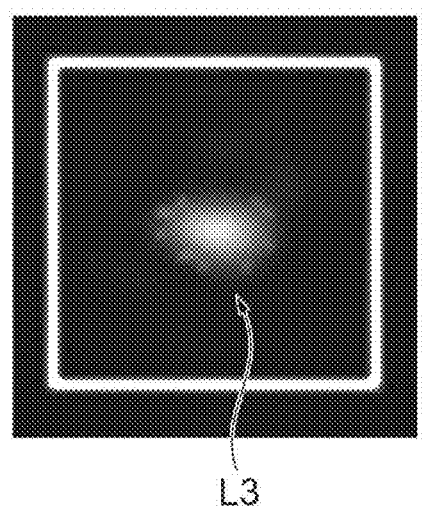
(b)

Fig.9
(a)
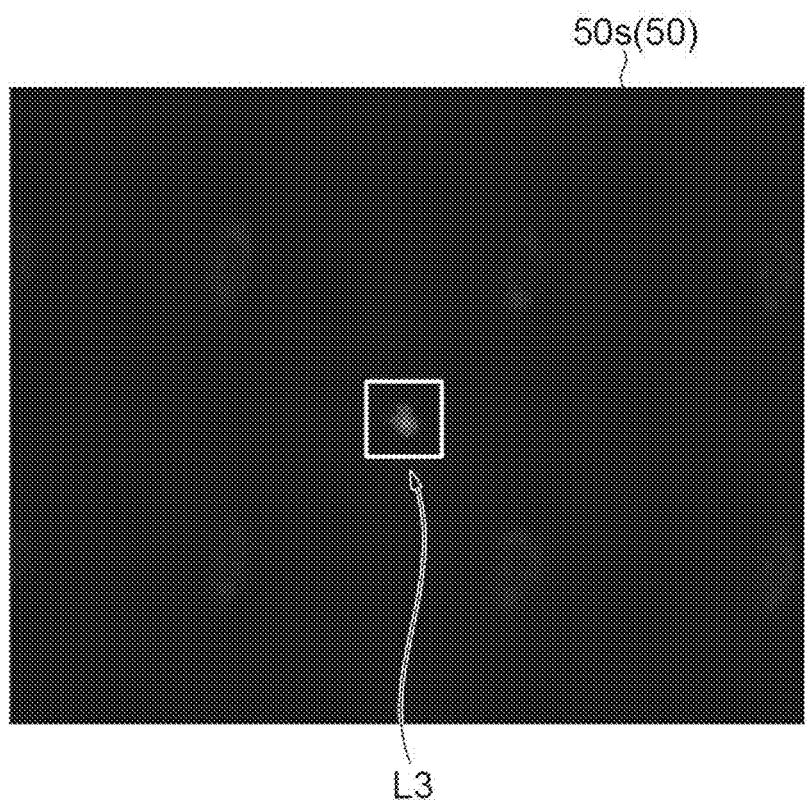
(b)
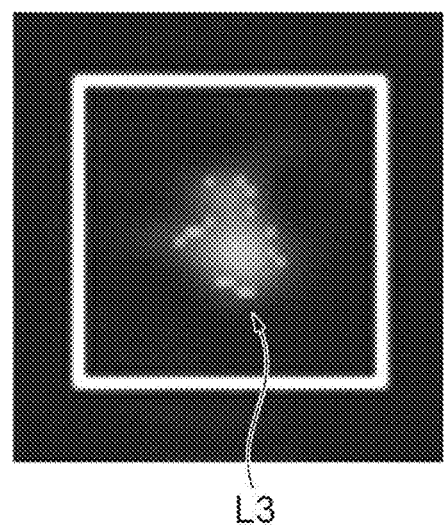

Fig.10
(a)
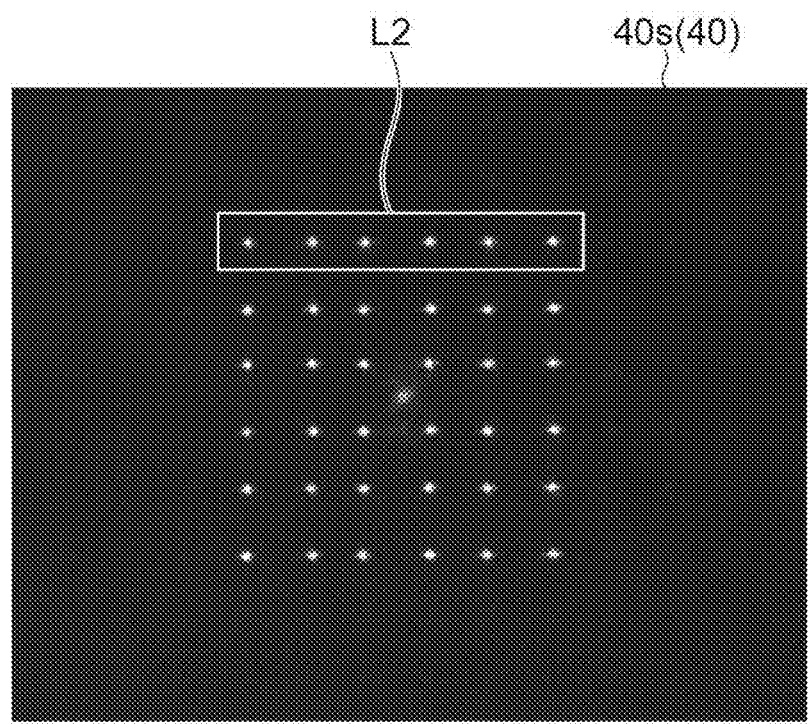
(b)
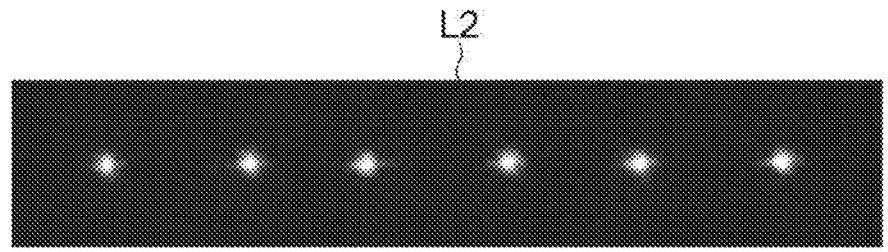

Fig.11
(a)
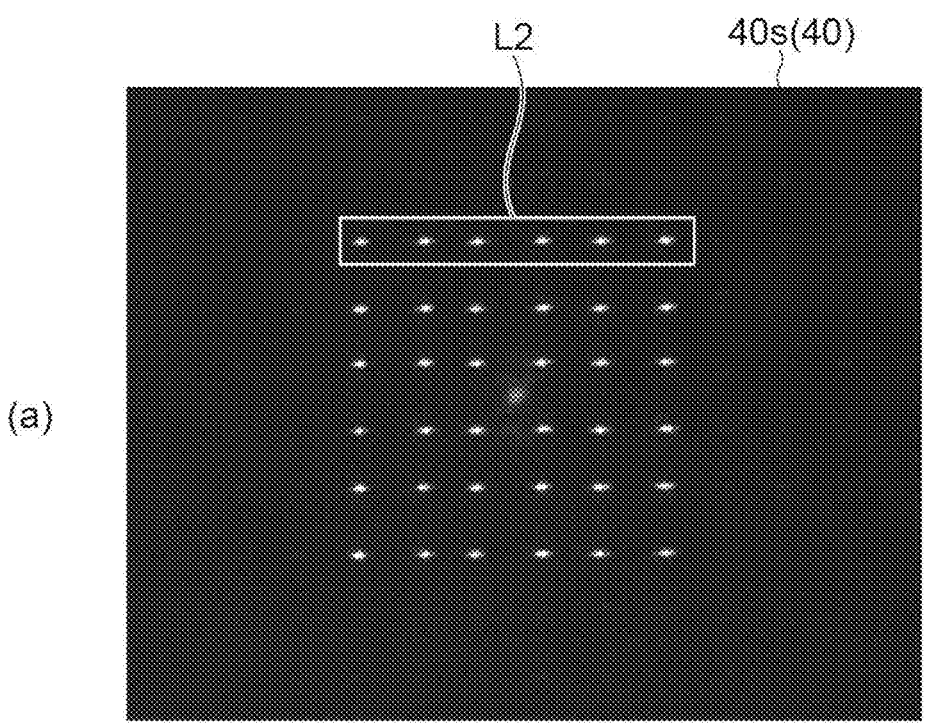
(b)
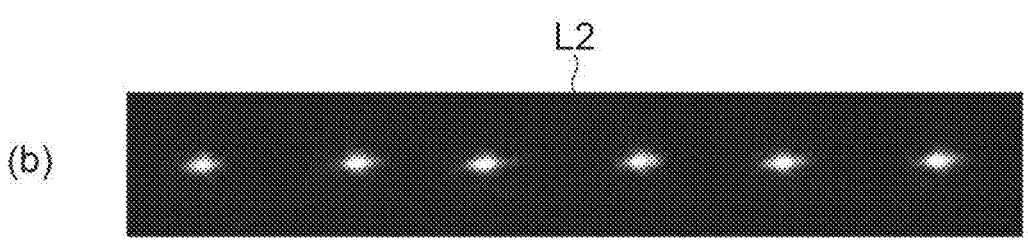

Fig.12
(a)
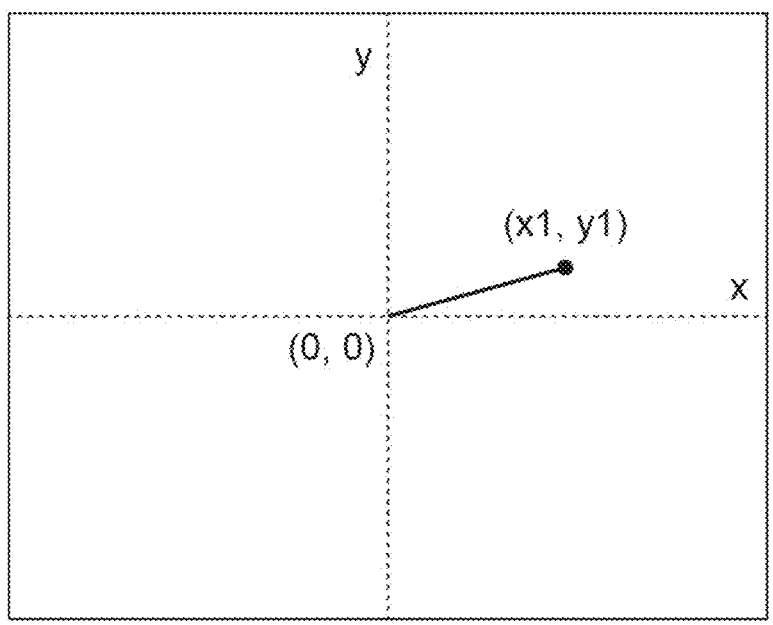
(b)
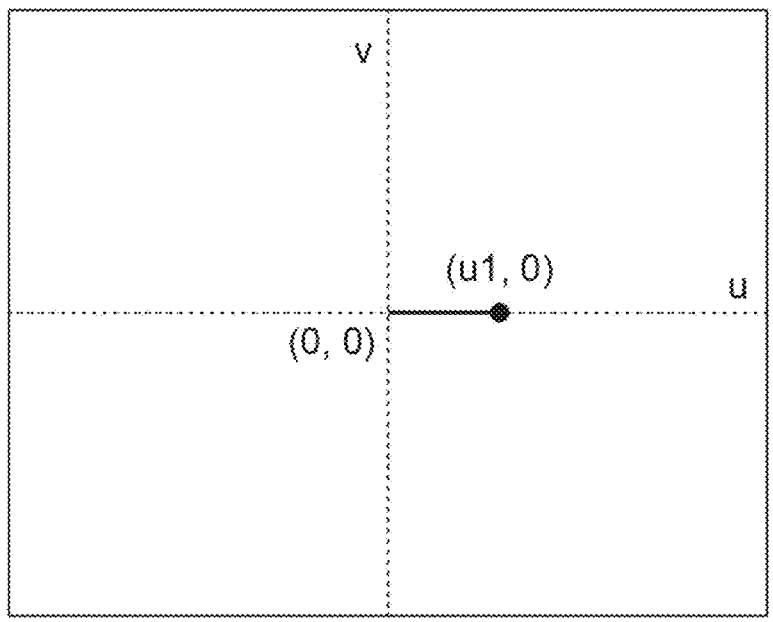

LASER DEVICE

TECHNICAL FIELD

The present disclosure relates to a laser device.

BACKGROUND ART

Patent Literature 1 describes a laser processing device. This laser processing device includes a converging lens, a variable focus lens, a convergence position measuring unit, a convergence position control unit, an optical system, and a light source. The converging lens causes laser light supplied from the light source to converge onto a surface to be treated of an object. The laser light supplied from the light source passes through an optical fiber, is optically shaped by the optical system, and converges through the converging lens. The variable focus lens is disposed on an optical path of the converging lens. The variable focus lens can change a focal length by voltage application. The convergence position measuring unit measures a convergence position of the converging lens using light extracted by a semi-reflection mirror.

CITATION LIST

Patent Literature

[Patent Literature 1] Japanese Unexamined Patent Publication No. 2020-040072

SUMMARY OF INVENTION

Technical Problem

In the laser processing device described in Patent Literature 1 described above, the convergence position control unit controls a focal position of the variable focus lens such that a difference between a convergence position measured by the convergence position measuring unit and a set specific convergence position is within a set allowable range. As a result, an initial focal position is maintained.

Incidentally, for example, in order to improve a processing speed, it is conceivable to adopt a phase controller such as a liquid crystal type spatial phase modulator (for example, LCOS-SLM) in the laser processing device described above and to branch the laser light into a plurality of rays. In this case, in a case where the convergence position changes with an operation of the laser processing device, it is conceivable to perform feedback control of the phase controller in order to correct the change. In this case, if it is possible to detect that the change in the convergence position is caused by the light source, the control of the phase controller becomes simple. However, in the laser processing device described above, since the semi-reflection mirror guides all the laser light to the convergence position measuring unit, it is difficult to detect whether the change in the convergence position is caused by the light source or is caused by another optical system such as the phase controller.

Accordingly, an object of the present disclosure is to provide a laser device capable of easily correcting a change in a convergence state.

Solution to Problem

As a result of intensive research to solve the above problem, the inventors of the present invention have obtained the following findings. That is, in a phase controller such as a spatial phase modulator, for example, a portion of incident laser light is subjected to phase control, is emitted as control light, and is used for irradiating an object, and another portion of the incident laser light is not subjected to the phase control and is emitted as non-control light. This non-control light tends to be treated as loss and noise because the desired phase control is not performed. However, on the other hand, since the non-control light is less likely to be affected by the phase controller, the non-control light maintains the characteristics of the laser light at a time point that it is emitted from a light source. Therefore, by detecting this non-control light, it is possible to detect a change in a convergence state caused by the light source, and it is possible to easily correct the change through feedback control of the phase controller. The present disclosure is the result of further studies by the inventors of the present invention on the basis of such findings.

That is, according to the present disclosure, there is provided a laser device including: a laser light source configured to emit laser light; a phase control unit configured to receive the laser light emitted from the laser light source, to control a spatial phase of a portion of the laser light, to emit the portion of the light as control light, and to emit another portion of the laser light as non-control light; a first optical system configured to irradiate an object with the control light emitted from the phase control unit; a detector configured to detect the non-control light emitted from the phase control unit; a second optical system configured to cause the non-control light emitted from the phase control unit to converge toward a detection surface of the detector; and a control unit configured to execute a correction process for controlling the phase control unit to correct a control state for a spatial phase of the control light in the phase control unit on the basis of a detection result for the non-control light from the detector.

In this laser device, a portion of the laser light emitted from the laser light source is controlled in the spatial phase by the phase control unit to become the control light and is used for the first optical system to irradiate the object. On the other hand, another portion of the laser light emitted from the laser light source converges toward the detection surface of the detector as the non-control light through the second optical system. As a result, the non-control light not subjected to the control in the phase control unit of the laser light emitted from the laser light source is detected. As shown in the above findings, this non-control light is less likely to be affected by the phase control unit and maintains the characteristics of the laser light when emitted from the light source. Therefore, the control unit can easily correct the change in the convergence state of the laser light (the control light) caused by the light source by controlling the phase control unit to correct the control state for the spatial phase of the control light in the phase control unit on the basis of the detection result for this non-control light.

As a result, even in a case where the characteristics of the laser light emitted from the laser light source change due to aging, for example, the convergence state of the laser light with which the object is irradiated can be easily maintained at a specific initial value. Particularly, if the specific initial value is common among the plurality of laser devices in a case where a plurality of laser devices are used in parallel, the convergence state of the laser light in each laser device is maintained at the common initial value even in a case where the change in the convergence state of the laser light emitted from the laser light source varies for each laser device, and thus a machine difference is reduced. In this way, since this laser device can reduce the machine difference, it is also effective in a case where the plurality of laser processing devices are used in parallel.

In the laser device according to the present disclosure, the control unit may execute a first acquisition process of acquiring a first deviation amount, which is a deviation amount of a position of the non-control light within a plane intersecting with an optical axis direction of the non-control light, on the basis of the detection result, and a first correction process, as the correction process, of controlling the phase control unit to correct positional deviation of the control light within a plane intersecting with an optical axis direction of the control light on the basis of the first deviation amount. In this case, it is possible to easily correct the positional deviation of the control light within the plane intersecting with the optical axis direction on the basis of the information on the positional deviation of the non-control light within the plane intersecting with the optical axis direction.

In the laser device according to the present disclosure, the control unit may execute a second acquisition process of acquiring a spread angle of the non-control light on the basis of the detection result, and a second correction process, as the correction process, of controlling the phase control unit to correct a spread angle of the control light on the basis of the acquired spread angle. In this case, it is possible to easily correct the change in the spread angle of the control light on the basis of the information on the change amount in the spread angle of the non-control light.

In the laser device according to the present disclosure, in the second acquisition process, the control unit may drive the detector in the optical axis direction of the non-control light while detecting the non-control light, acquire a second deviation amount which is a deviation amount of a position at which the non-control light most converges on the detection surface, from an initial position, and acquire the spread angle on the basis of the second deviation amount. In this case, according to the mechanical driving of the detector, it is possible to acquire the information on the change in the spread angle of the non-control light.

In the laser device according to the present disclosure, the phase control unit may include a polarization control element configured to change a polarization direction of the laser light such that the received laser light includes an S-polarized component and a P-polarized component and to emit the changed laser light, and a liquid crystal type spatial phase modulator configured to control a spatial phase of the P-polarized component of the laser light emitted from the polarization control element, to emit the controlled P-polarized component as the control light, and to emit the S-polarized component of the laser light as the non-control light, and wherein, in the correction process, the control unit may adjust a phase modulation pattern displayed on the liquid crystal type spatial phase modulator on the basis of a detection result for the non-control light to correct a control state for a spatial phase of the control light in the phase control unit. In this way, in a case where the phase control unit includes the liquid crystal type spatial phase modulator, if the polarization direction is adjusted such that the laser light contains both the P-polarized light and the S-polarized light, while the S-polarized component that is not sensitive to the liquid crystal layer is suitably used as the non-control light, the change in the convergence state of the control light can be easily corrected through the adjustment of the phase modulation pattern (the hologram) displayed on the liquid crystal layer.

In the laser device according to the present disclosure, the phase control unit may include a liquid crystal type spatial phase modulator that displays a phase modulation pattern for diffracting the received laser light to branch the laser light into a plurality of rays of diffraction light and to emit the branched rays of diffraction light, emits 0th-order light of the laser light as the non-control light, and emits another order diffraction light of the laser light as the control light, and in the correction process, the control unit may adjust the phase modulation pattern displayed on the liquid crystal type spatial phase modulator on the basis of a detection result for the non-control light to correct a control state for a spatial phase of the control light in the phase control unit. In this way, in a case where the liquid crystal type spatial phase modulator is included and the laser light is branched into a plurality of rays by diffraction, while the 0th-order light that is not diffracted is suitably used as the non-control light, the change in the convergence state of the control light can be easily corrected through the adjustment of the phase modulation pattern (the hologram) displayed on the liquid crystal layer.

The laser device according to the present disclosure may further include: another detector configured to detect the control light emitted from the phase control unit, wherein the control unit may generate a phase modulation pattern for adjusting a control state for a spatial phase of the control light in the phase control unit on the basis of a detection result of the control light from the another detector and cause the liquid crystal type spatial phase modulator to display the phase modulation pattern superimposed on the phase modulation pattern adjusted by the correction process. In this case, the control state of the control light can be adjusted in accordance with the change in the laser light (the control light) caused by something other than the light source on the basis of the detection result of the control light.

Advantageous Effects of Invention

According to the present disclosure, it is possible to provide a laser device capable of easily correcting a change in a convergence state.

BRIEF DESCRIPTION OF DRAWINGS

FIG. 6 is an image showing an image capturing surface of a second detector.

FIG. 7 is an image showing an image capturing surface of a first detector.

FIG. 8 is an image showing an image capturing surface of a second detector.

FIG. 9 is an image showing an image capturing surface of a second detector.

FIG. 10 is an image showing an image capturing surface of a first detector.

FIG. 11 is an image showing an image capturing surface of a first detector.

FIG. 12 is a diagram for explaining an example of coordinate transformation.

DESCRIPTION OF EMBODIMENTS

Figure 1:
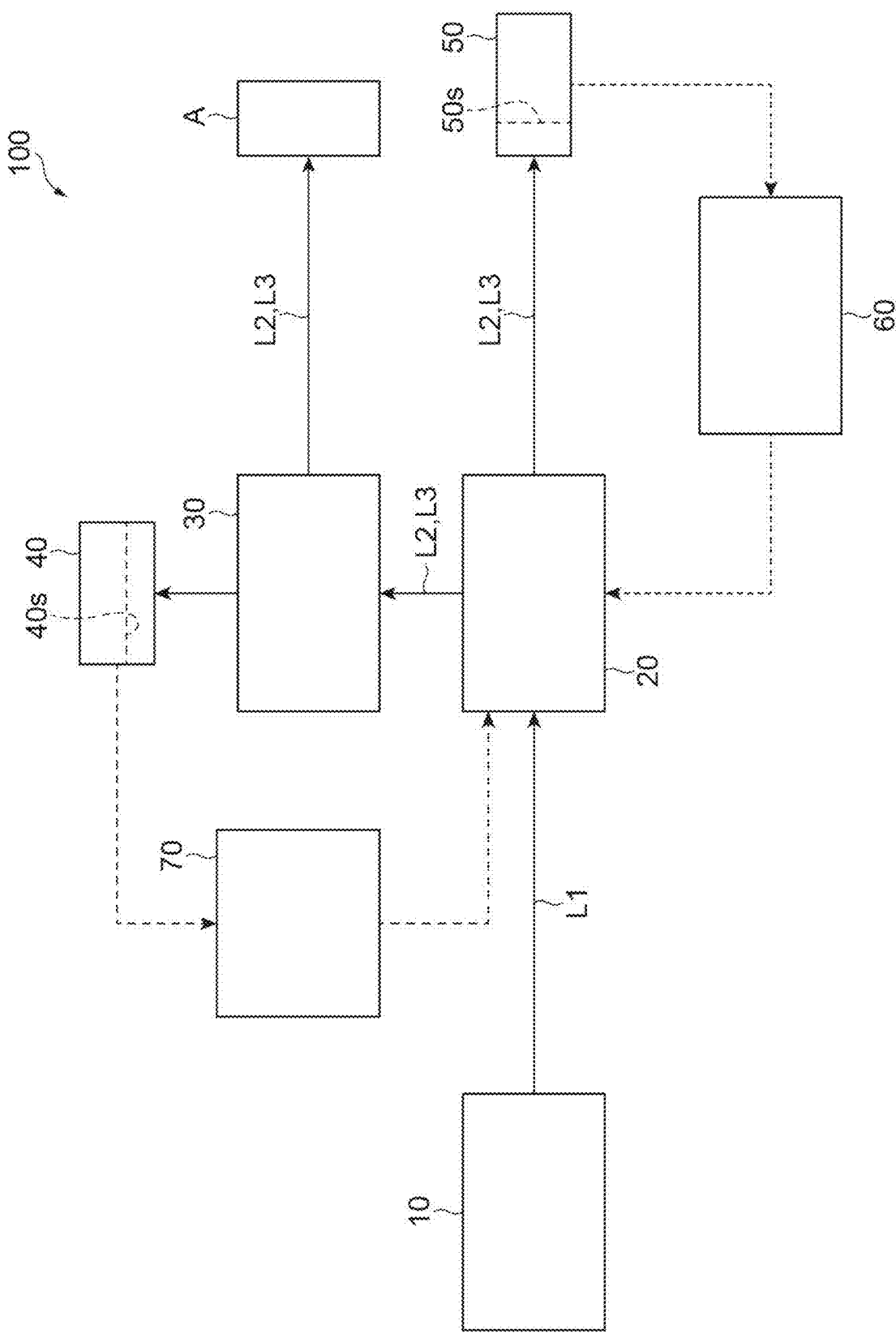
FIG. 1 is a block diagram of a laser processing device according to an embodiment.
Figure 2:
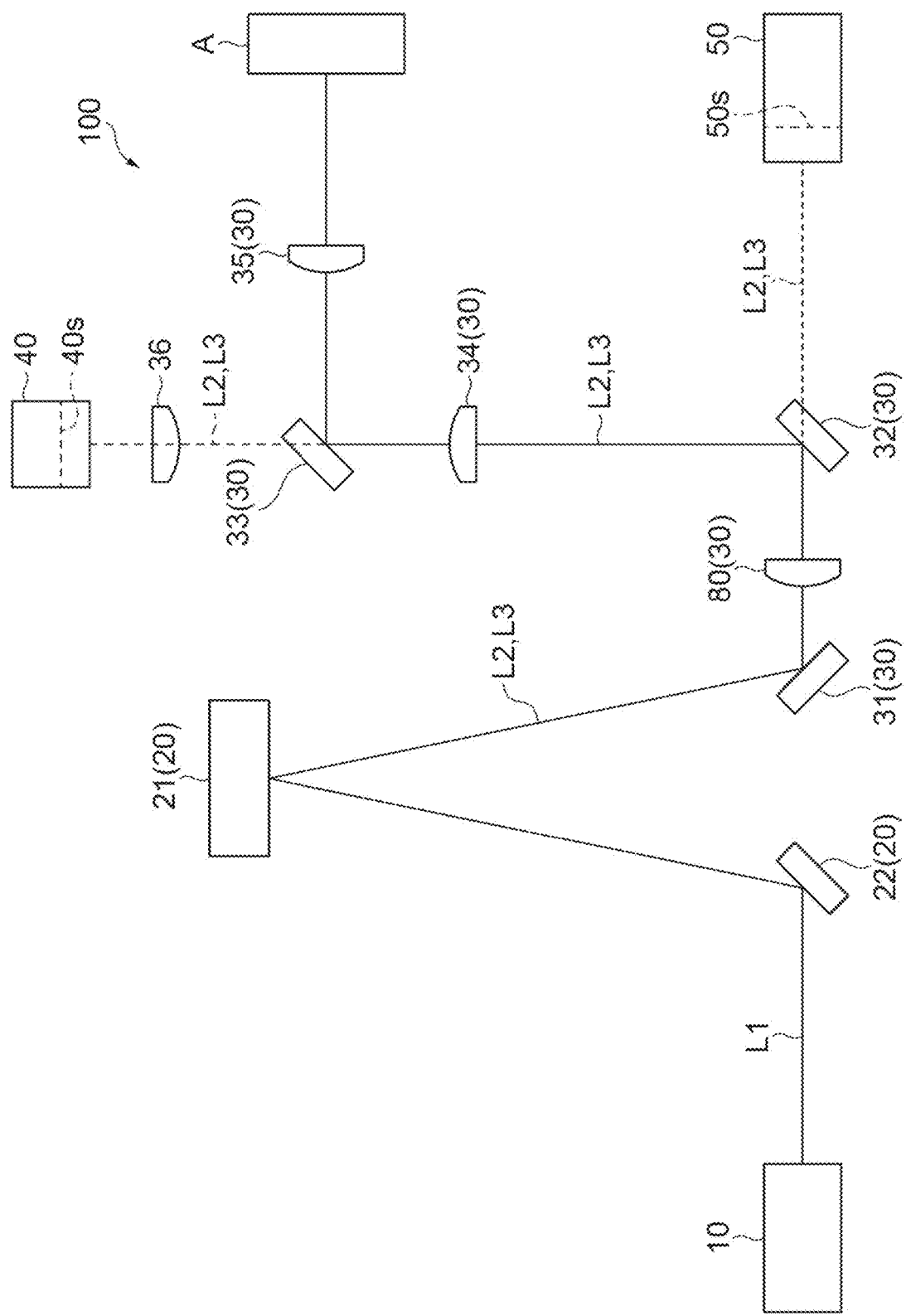
FIG. 2 is a schematic view of the laser processing device shown in FIG. 1.

Hereinafter, an embodiment will be described in detail with reference to the drawings. The same or corresponding parts in the drawings are denoted with the same reference signs, and repetitive description may be omitted. FIG. 1 is a block diagram of a laser processing device according to an embodiment. FIG. 2 is a schematic view of the laser processing device shown in FIG. 1. As an example, the laser processing device (a laser device) 100 shown in FIGS. 1 and 2 performs drilling, cutting, fine processing of a semiconductor, and the like of an object A by irradiating the object A with laser light.

The laser processing device 100 includes a laser light source 10, a phase control unit 20, a first optical system 30, a first detector 40, a second detector 50, and a control unit 60. The laser light source 10 emits laser light L1. The phase control unit 20 includes a spatial phase modulator (a liquid crystal type spatial phase modulator) 21 and a mirror 22 that guides the laser light L1 to the spatial phase modulator 21. The spatial phase modulator 21 has a liquid crystal layer, displays an arbitrary phase modulation pattern (a hologram, a computer generated hologram (CGH)) on the liquid crystal layer under control of the control unit 60, and controls a spatial phase of the laser light L1 according to the phase modulation pattern.

A portion of the laser light L1 incident on the spatial phase modulator 21 is emitted from the spatial phase modulator 21 with its spatial phase being controlled, while another portion of the laser light L1 incident on the spatial phase modulator 21 is emitted from the spatial phase modulator 21 without its spatial phase being controlled. That is, the phase control unit 20 receives the laser light L1 emitted from the laser light source 10, controls the spatial phase of the portion of the laser light L1, emits the portion of the light as control light L2, and emits the other portion of the laser light L1 as non-control light L3.

A first optical system 30 guides the control light L2 emitted from the phase control unit 20 and irradiates the object A with the control light L2. The first optical system 30 includes mirrors 31, 32, and 33 that guide the control light L2 emitted from the spatial phase modulator 21 toward the object A. The control light L2 and the non-control light L3 are reflected by the mirrors 31, 32, and 33 in order, and the object A is irradiated with the reflected light. Further, the first optical system 30 includes lenses 80, 34, and 35 disposed in order on an optical path of the control light L2 and the non-control light L3 which is formed by the mirrors 31, 32, and 33. The lens 80 and the lens 34 form an image of the control light L2 of the spatial phase modulator 21 on the lens 35. The lens 35 is a converging lens that faces the object A to cause the control light L2 to converge toward the object A.

The first detector (another detector) 40 is, for example, a camera for capturing an image of the control light L2 and can be used for detecting a change in the characteristics of the control light L2 under control of a control unit 70. The detection result of the first detector 40 can be used for feedback control of the control light L2 by the phase control unit 20, for example. Details of such feedback control will be described later. In addition to the control light L2, the non-control light L3 may also be incident on the first detector 40. Therefore, the first detector 40 can also capture an image of the non-control light L3. For example, the first detector 40 is disposed on an extension line of the optical path of the control light L2 and the non-control light L3 directed from the mirror 32 to the mirror 33 and captures an image of a portion of the control light L2 (and the non-control light L3) which is transmitted through the mirror 33 and of which an image is formed on an image capturing surface 40s. An image corresponding to a processing surface of the object A is formed on the image capturing surface 40s of the first detector 40.

The second detector (a detector) 50 is, for example, a camera for capturing an image of the non-control light L3 and can be used for detecting a change in the characteristics of the non-control light L3 under control of the control unit 60. The detection result of the second detector 50 can be used for feedback control of the non-control light L3 by the phase control unit 20, for example. Details of such feedback control will be described later. In addition to the non-control light L3, the control light L2 may also be incident on the second detector 50. Therefore, the second detector 50 can also capture an image of the control light L2. Here, the second detector 50 is disposed on an extension line of the optical path of the non-control light L3 (and the control light L2) directed from the mirror 31 to the mirror 32 and captures an image of a portion of the non-control light L3 (and the control light L2) which is transmitted through the mirror 32 and of which an image is formed on an image capturing surface 50s (a detection surface). The lens 80 is also a second optical system used for causing the non-control light L3 (and the control light L2) to converge toward the image capturing surface 50s.

Figure 3:
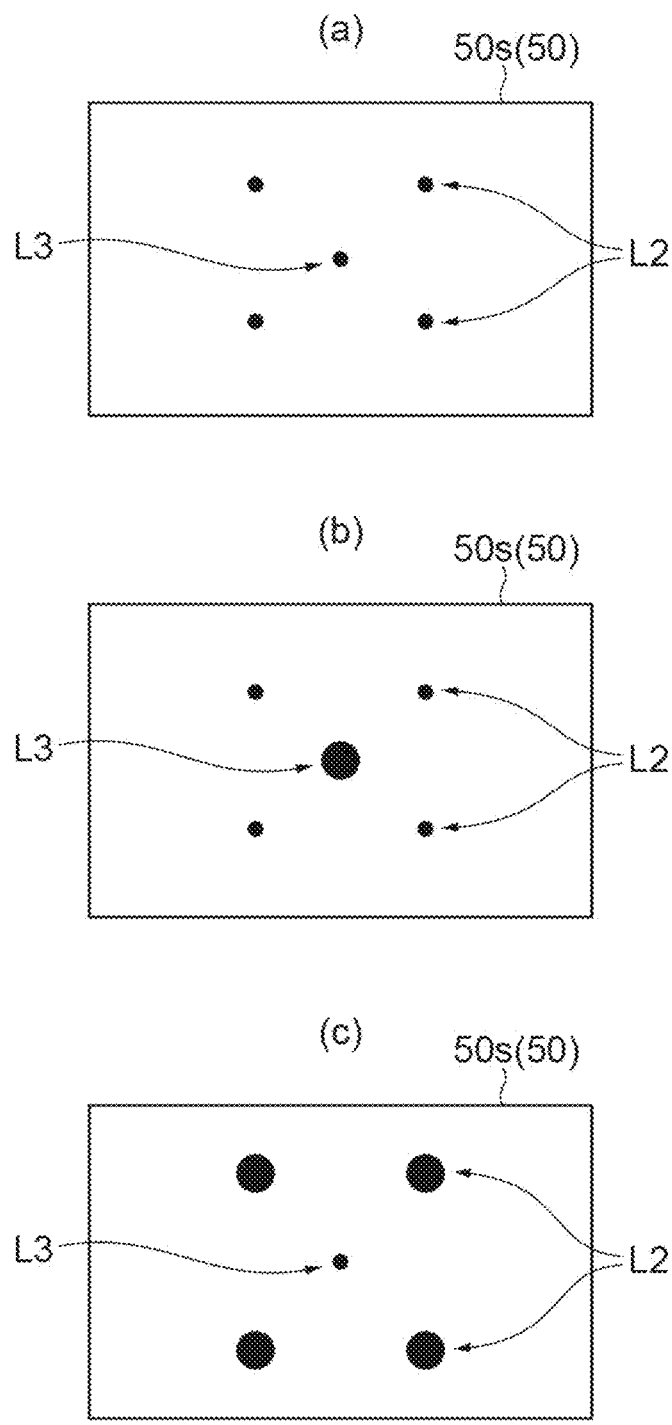
FIG. 3 is a diagram showing an image capturing surface of a second detector shown in FIGS. 1 and 2.

FIG. 3 is a diagram showing the image capturing surface of the second detector shown in FIGS. 1 and 2. Here, as an example, by a phase modulation pattern including a diffraction grating pattern being displayed on the spatial phase modulator 21, the laser light L1 is branched into a plurality of rays of diffraction light, and a plurality of beam spots are formed on the image capturing surface 50s. In the example of FIG. 3(a), a beam spot of the non-control light L3, which is 0th-order light, is formed in the center, and beam spots of the control light L2, which is 1st-order light, are formed around the center, for example. In the example of FIG. 3(a), the control light L2 and the non-control light L3 converge on the image capturing surface 50s by a distance Z between the lens 80 and the image capturing surface 50s being set to a focal length fin of the lens 80.

On the other hand, when a pattern corresponding to a predetermined Fresnel lens is superimposed on the phase modulation pattern of the spatial phase modulator 21 and the second detector 50 (the image capturing surface 50s) is moved in an optical axis direction by position shift from the focal length fin due to addition of a focal length fFL of the Fresnel lens, as shown in FIG. 3(b), the control light L2 subjected to the control of the spatial phase of the spatial phase modulator 21 converges on the image capturing surface 50s, and a convergence position of the non-control light L3 not subjected to the control of the spatial phase modulator 21 is deviated from the image capturing surface by the focal length fFL to expand the beam spot. Meanwhile, as shown in FIG. 3(c), when the image capturing surface 50s is returned to a position shown in FIG. 3(a), a convergence position of the control light L2 is deviated from the image capturing surface 50s by the focal length fFL of the Fresnel lens to expand the beam spots, and the non-control light L3 converges on the image capturing surface 50s as before.

Figure 4:
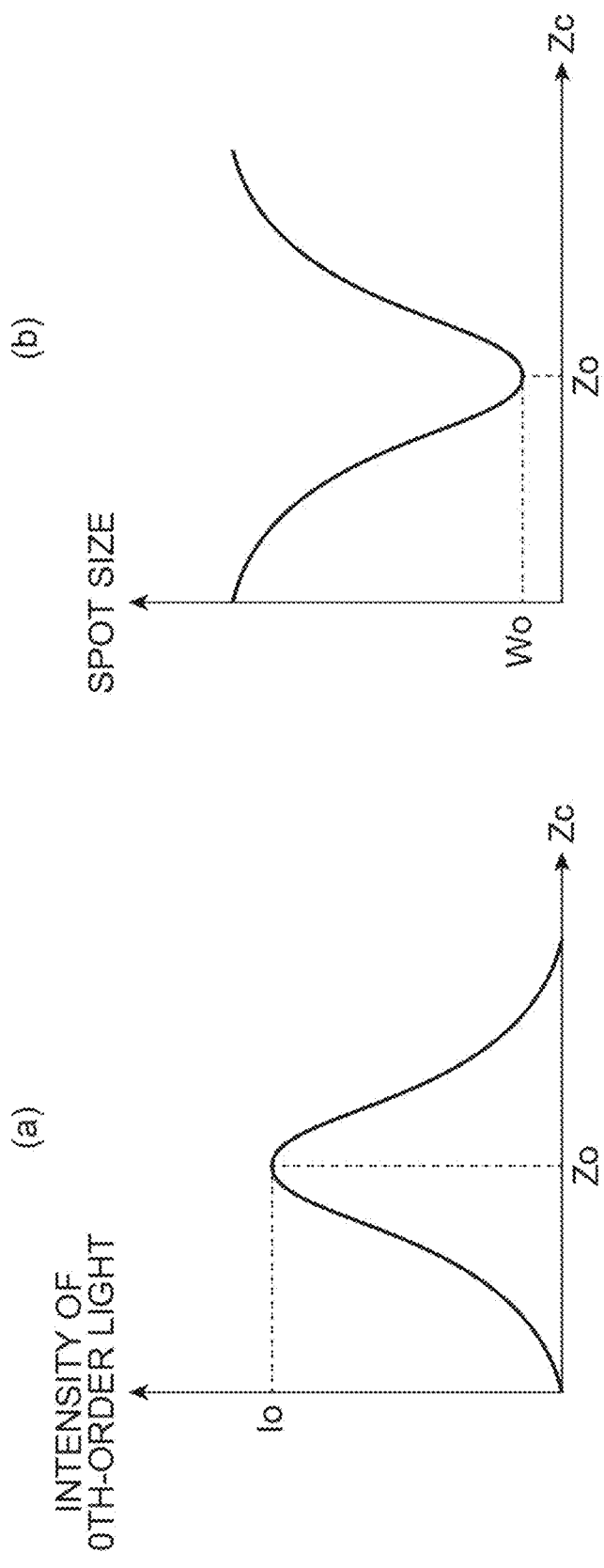
FIG. 4 is a graph showing a state in which a convergence position of non-control light is detected.

A position of the image capturing surface 50s in the optical axis direction where the non-control light L3 converges (a distance ZO between the lens 80 and the image capturing surface 50s) can be detected, for example, as follows. That is, as shown in a graph of FIG. 4, the distance ZO can be acquired as, for example, a value at which an intensity of the non-control light L3 is the maximum value IO, or a value at which a spot size of the non-control light L3 on the image capturing surface 50s is the minimum value WO by capturing an image of the non-control light L3 while moving the image capturing surface 50s of the second detector 50 in the optical axis direction and acquiring the detection result. Each process of the control and the light detection of the phase control unit 20 and the second detector 50 can be implemented by the control unit 60. Similar to this, each process of the control and the light detection for the control light L2 can be implemented by the control unit 70. The control unit 60 and the control unit 70 may perform different kinds of control on the first detector 40 and the second detector 50. That is, the control unit may implement each process of the control and the light detection for the control light L2 different from that for the non-control light L3.

That is, the control unit 60 can control at least the phase control unit 20 and the second detector 50. Further, the control unit 70 can control at least the phase control unit 20 and the first detector 40. The control unit 60 executes a process for controlling the phase control unit to correct a control state for a spatial phase of the control light L2 in the phase control unit 20 on the basis of a detection result for the non-control light L3 from the second detector 50. Further, the control unit 70 executes a process for controlling the phase control unit 20 to correct a control state for a spatial phase of the control light L2 in the phase control unit 20 on the basis of a detection result for the control light L2 from the first detector 40. These processes will be described in detail later. Each of the control units 60 and 70 has a processing part, a storage part, and an input reception part (not shown). The processing part is configured as a computer device including a processor, a memory, a storage, a communication device, and the like. In the processing part, the processor executes software (a program) read from the memory or the like and controls reading and writing of data in the memory and the storage, and communication of a communication device. The storage part is, for example, a hard disk or the like, and stores various types of data. The input reception part is an interface unit that displays various pieces of information and receives input of various pieces of information from the user.

Figure 5:
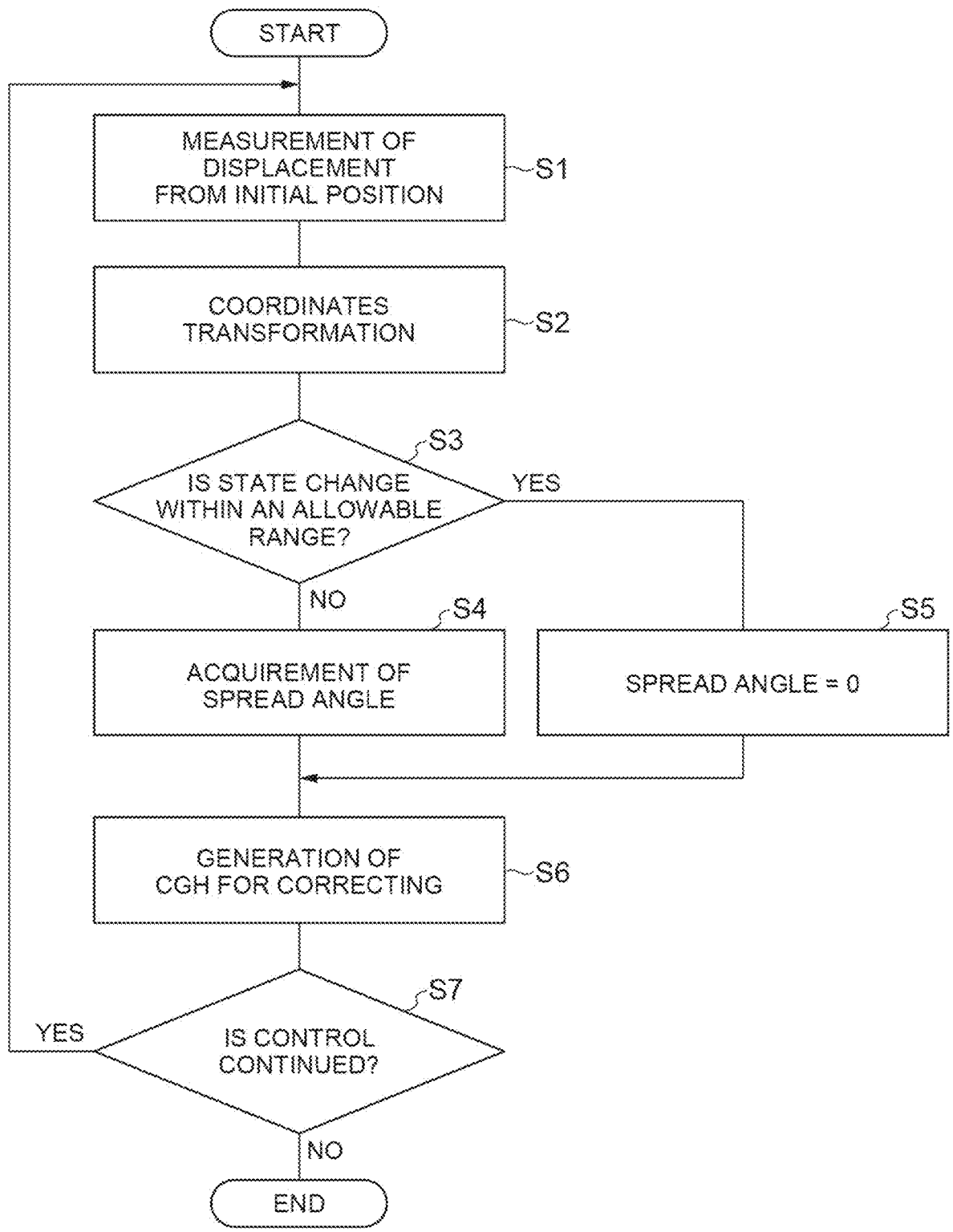
FIG. 5 is a flowchart showing a correction method for laser light.

Subsequently, the details of an operation of the control unit 60 will be described by describing a correction method for the laser light implemented by the laser processing device 100. This method is implemented by the control unit 60 executing each process. FIG. 5 is a flowchart showing the correction method for the laser light. The control unit 60 holds information indicating an initial state of the laser processing device 100 in advance. The information about the initial state held by the control unit 60 includes, for example, initial values of a position (coordinates), a spot size (a beam area), luminance, and the like of the non-control light L3 on the image capturing surface 50s, and initial values of a position (coordinates), a spot size (a beam area), a luminance, and the like of the control light L2 on the image capturing surface 40s.

Here, first, the control unit 60 measures displacement from an initial position (step S1). More specifically, the control unit 60 executes a first acquisition process of acquiring a first deviation amount which is a deviation amount of a current position of the non-control light L3 from the initial position within a plane intersecting with an optical axis of the non-control light L3 (here, the image capturing surface 50s, and hereinafter it may be referred to as "an XY plane") by capturing an image of the non-control light L3 using the second detector 50. FIG. 6 (a) shows a state where the beam spot of the non-control light L3 is at the initial position (x, y) in the XY plane, and FIG. 6 (b) shows a state were the beam spot of the non-control light L3 is at a position (x+Δx, y+Δy) displaced from the initial position (x, y) in the XY plane. That is, here, each of Δx and Δy is acquired as the first deviation amount. As an example, Δx=+47 pixels, and Δy=−26 pixels. Such deviation may occur, for example, due to aging.

FIG. 7 is an image showing the image capturing surface 40s of the first detector 40. FIG. 7(a) shows a state where the beam spot of the control light L2 is at the initial position. As shown in FIG. 7(b), if the non-control light L3 is deviated from the initial position on the XY plane, the control light L2 is also deviated within the plane intersecting with the optical axis. For example, in Δu and Δv, each of which is the deviation amount on the image capturing surface 40s, Δu=+18 pixels, and Δv=−10 pixels. As shown in FIGS. 6 and 7, the control light L2 subjected to the control of the phase control unit 20 is deviated, and the non-control light L3 not subjected to the control of the phase control unit 20 is also deviated. Therefore, it is understood that the deviation includes at least that caused by the laser light source 10 which is a front stage side of the phase control unit 20.

In this step S1, the control unit 60 further executes a second acquisition process of acquiring displacement of a spread angle of the non-control light L3 from the initial position by capturing an image of the non-control light L3 using the second detector 50. FIG. 8(a) is an image showing a case where the beam spot of the non-control light L3 on the XY plane is in an initial state. FIG. 8(b) is an enlarged view of FIG. 8(a). On the other hand, FIG. 9 (a) is an image showing a state where the beam spot of the non-control light L3 has changed from the initial state in the XY plane. FIG. 9(b) is an enlarged view of FIG. 9(a). As shown in FIGS. 8 and 9, here, the spread angle of the non-control light L3 changes within the XY plane. In addition, in FIGS. 8 and 9, dots drawn by software for detecting the beam spot are shown on an outer peripheral portion of the beam spot.

The control unit 60 acquires a change amount ΔS of the spot size of the non-control light L3 on the XY plane from an initial value S and/or a change amount ΔI of the intensity of the non-control light L3 on the XY plane from an initial value I on the basis of the detection result (the image) of the second detector 50. These change amounts ΔS and ΔI serve as indices indicating the spread angle of the non-control light L3.

FIG. 10 is an image showing the image capturing surface 40s of the first detector 40. FIG. 10(a) is an image showing a case where the beam spot of the control light L2 is in an initial state. FIG. 10(b) is an enlarged view of FIG. 10(a). On the other hand, FIG. 11 (a) is an image showing a state where the beam spot of the control light L2 has changed from the initial state. FIG. 11(b) is an enlarged view of FIG. 11(a). As shown in FIGS. 10 and 11, here, the spread angle of the control light L2 also changes.

As shown in FIGS. 8 to 11, if the spread angle of the non-control light L3 changes, the spread angle of the control light L2 also changes. While the spread angle of the control light L2 subjected to the control of the phase control unit 20 changes, the spread angle of the non-control light L3 not subjected to the control of the phase control unit 20 also changes. Therefore, it is understood that the change includes at least that caused by the laser light source 10.

In the subsequent step, the control unit 60 transforms the coordinates (x+Δx, y+Δy) on the XY plane (the image capturing surface of the non-control light L3 including Δx and Δy as the first deviation amount into the coordinates on a hologram displayed by the spatial phase modulator 21 (hereinafter it may be referred to as "coordinates on a UV plane") (step S2). FIG. 12 is a diagram for explaining an example of coordinate transformation. The transformation of a scale s between the coordinates on the XY plane and the coordinates on the UV plane is shown by the following equation (1), and the transformation of an angle θ is shown by the following equation (2). Therefore, the coordinate transformation between the coordinates on the XY plane and the coordinates on the UV plane is given by the following equation (3). As an example, when the coordinates of the non-control light L3 on the XY plane are (x1, y1), the coordinates of the non-control light L3 on the UV plane are calculated as (u1, 0).

[Math. 1]
$$s = \frac{\sqrt{x1^2 + y1^2}}{u1} \quad (1)$$

[Math. 2]
$$\theta = \tan^{-1}\left(\frac{y1}{x1}\right) \quad (2)$$

[Math. 3]
$$\begin{bmatrix} u \\ v \end{bmatrix} = \frac{1}{s}\begin{bmatrix} \cos\theta & -\sin\theta \\ \sin\theta & \cos\theta \end{bmatrix}\begin{bmatrix} x \\ y \end{bmatrix} \quad (3)$$

In the subsequent step, the control unit 60 determines whether or not the state change of the non-control light L3 is within an allowable range (step S3). More specifically, the control unit 60 determines whether or not the change amount ΔS of the spot size of the non-control light L3 on the XY plane from the initial value S and/or the change amount ΔI of the intensity of the non-control light L3 on the XY plane from the initial value I, which are acquired in step S1, is within the allowable range. That is, here, as an example, it is determined whether or not the spread angle is within the allowable range.

In a case where the state change of the non-control light L3 is not within the allowable range as a result of the determination in step S3 (step S3: No), the control unit 60 acquires the spread angle of the non-control light L3 on the XY plane (step S4, the second acquisition process). More specifically, the control unit 60 first drives the second detector 50 in the optical axis direction of the non-control light L3 while detecting the non-control light L3 using the second detector 50 and acquires a second deviation amount which is a deviation amount of a position at which the non-control light L3 most converges on the image capturing surface 50s, from the initial position.

Figure 13:
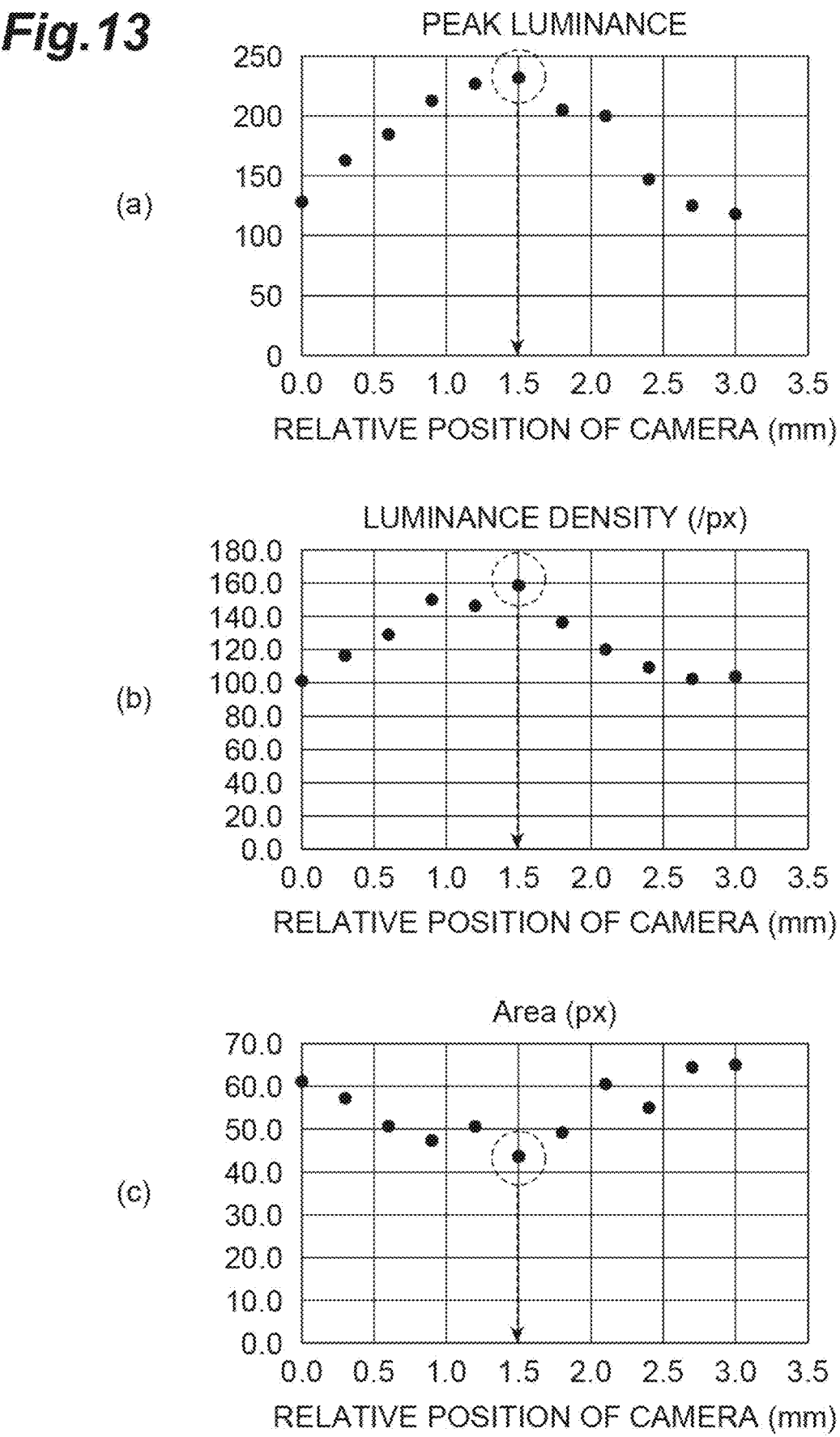
FIG. 13 is a graph of a case where a second deviation amount is acquired on the basis of various indices.

FIG. 13 is a graph of a case where the second deviation amount is acquired on the basis of various indices. In FIG. 13, a horizontal axis indicates a relative position (that is, the second deviation amount) of the second detector 50 (the camera) in the optical axis direction from the initial position. FIG. 13(a) uses the peak luminance of the non-control light L3 as an index, and FIG. 13(b) uses the luminance density of the non-control light L3 as an index. In these cases, the maximum value of each index is obtained by moving the second detector 50 in the optical axis direction, and thus the relative position at which the maximum value is obtained becomes the second deviation amount.

On the other hand, FIG. 13(c) uses the spot size (the beam area) as an index. In this case, the minimum value can be obtained by moving the second detector 50 in the optical axis direction. Then, the relative position at which the minimum value is obtained becomes the second deviation amount. Here, in either case, the second deviation amount of 1.5 mm is acquired. The second deviation amount is a shift amount of the focal position of the non-control light L3 in the optical axis direction.

Furthermore, here, the control unit 60 calculates the spread angle of the non-control light L3 on the basis of the acquired second deviation amount. The spread angle is calculated as the focal length fFL of the Fresnel lens corresponding to the second deviation amount. The focal length fFL corresponding to the second deviation amount is obtained by the following equation. Specifically, the following equation (4) relates to a focal length f0 of the composite lens of the Fresnel lens and the lens 80 realized by the CGH displayed on the spatial phase modulator 21, and the following equations (5) and (6) are obtained by transforming the following equation (4) into an equation for the focal length fFL of the Fresnel lens. d in the following equation is a distance between the lens and the Fresnel lens.

[Math. 4]
$$f_0 = \frac{f_m \cdot f_{FL}}{f_m + f_{FL} - d} \quad (4)$$

[Math. 5]
$$f_{FL} = \frac{d - f_m}{\left(1 - \frac{f_m}{f_0}\right)} \quad (5)$$

[Math. 6]
$$f_{FL} = \frac{f_0(d - f_m)}{f_0 - f_m} \quad (6)$$

On the other hand, when the second deviation amount (the shift amount of the focal position) acquired as described above is Δd, f0=fm+Δd. Therefore, when this is introduced in the above equation (6), the focal length fFL of the corresponding Fresnel lens is represented as the following equation (7). In addition, when this equation is further transformed, the focal length fFL is acquired as the following equation (8). As an example, when Δd is 1.5 mm as above, the focal length fFL of the corresponding Fresnel lens is 62570 mm

[Math. 7]

$$f_{FL} = \frac{(f_m + \Delta d)(d - f_m)}{(f_m + \Delta d) - f_m} \qquad (7)$$

[Math. 8]

$$f_{FL} = \frac{(f_m + \Delta d)(d - f_m)}{\Delta d} \qquad (8)$$

In a case where the state change of the non-control light L3 is within the allowable range as a result of the determination in step S3 (step S3: YES), the control unit 60 assumes that the spread angle of the non-control light L3 is 0, that is, assumes that the focal length fFL of the Fresnel lens is infinite (step S5), and the process proceeds to subsequent step S6. The focal length fFL of the Fresnel lens being infinite means that a component of the Fresnel lens is not added when a CGH for correction is generated. Further, in the above example, a case where the spread angle is positive (a case where a change in a divergence direction occurs) is shown, but a case where the spread angle is negative (a case where a change in a convergence direction occurs) is also possible.

In the subsequent step, the control unit 60 generates a CGH for correcting the state change as described above (step S6). More specifically, the control unit 60 generates a CGH on which a pattern including Δx and Δy each of which is the first deviation amount acquired as described above and parameters (−Δu, −Δv, −fFL) for counteracting the focal length fFL of the Fresnel lens as the spread angle corresponding to the second deviation amount is superimposed. The control unit 60 causes the spatial phase modulator 21 to display the generated CGH. As a result, the spatial phase of the control light L2 is controlled by the spatial phase modulator 21 on which the CGH is displayed (according to the CGH), and the positional deviation of the control light L2 within the plane intersecting with the optical axis direction and the spread angle of the control light L2 are corrected, and thus it is maintained in the initial state.

Figure 14:
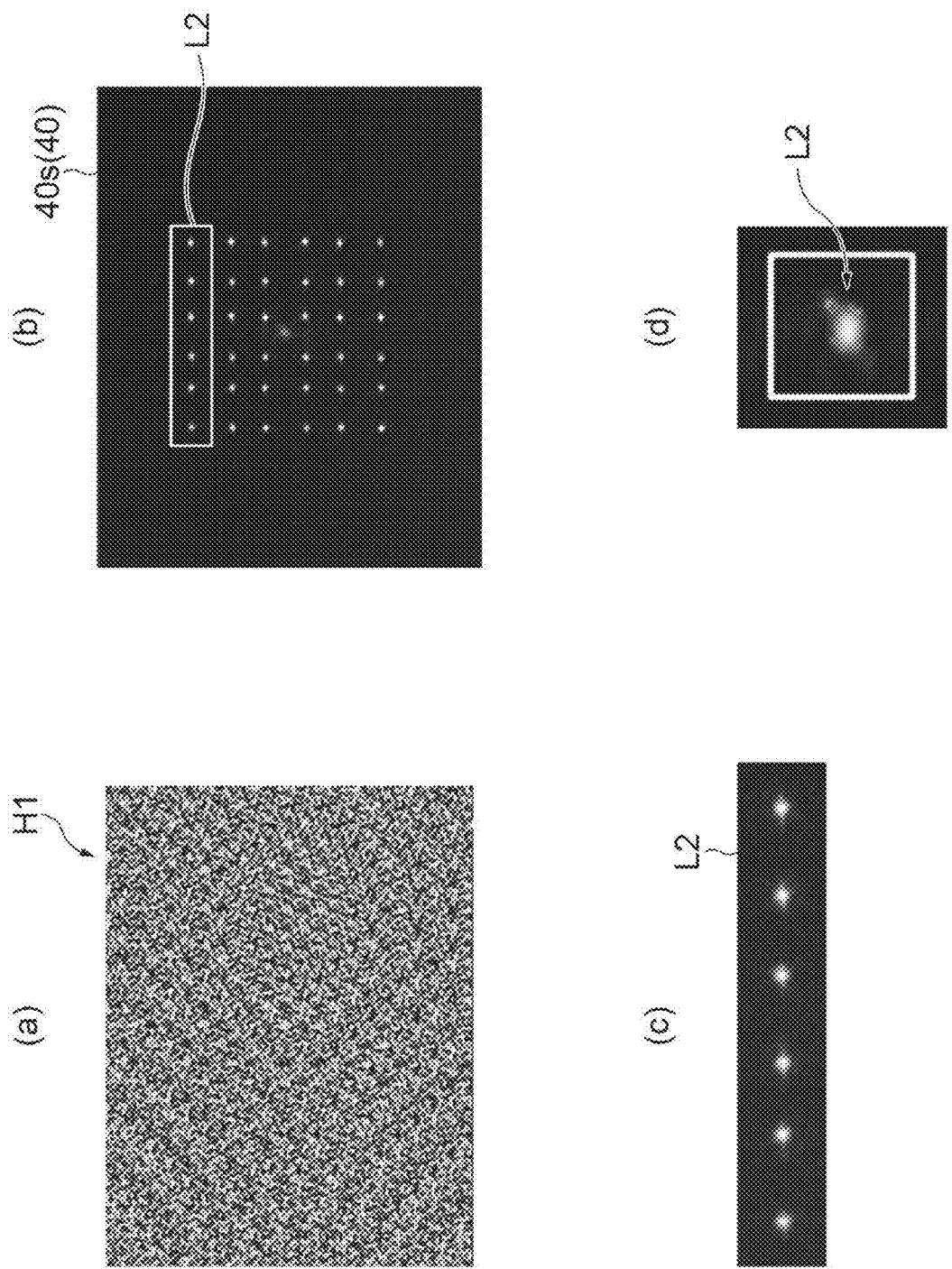
FIG. 14 is a diagram showing a state in which control light is corrected.

This point will be described more specifically. FIG. 14(a) shows the CGH for correction actually generated. The control unit 60 causes the spatial phase modulator 21 to display this CGH. As a result, as shown in FIGS. 14(b) to 14(d), the spread angle (the luminance, the spot size) of the control light L2 is corrected as compared with FIG. 11, and it is understood that it returns to the initial state of FIG. 10. Similarly, the positional deviation of the control light L2 which occurs within the plane intersecting with the optical axis direction as shown in FIG. 15(b) from the initial state of FIG. 15(a) is corrected as shown in FIG. 15(c), and thus it returns to the initial state.

Figure 15:
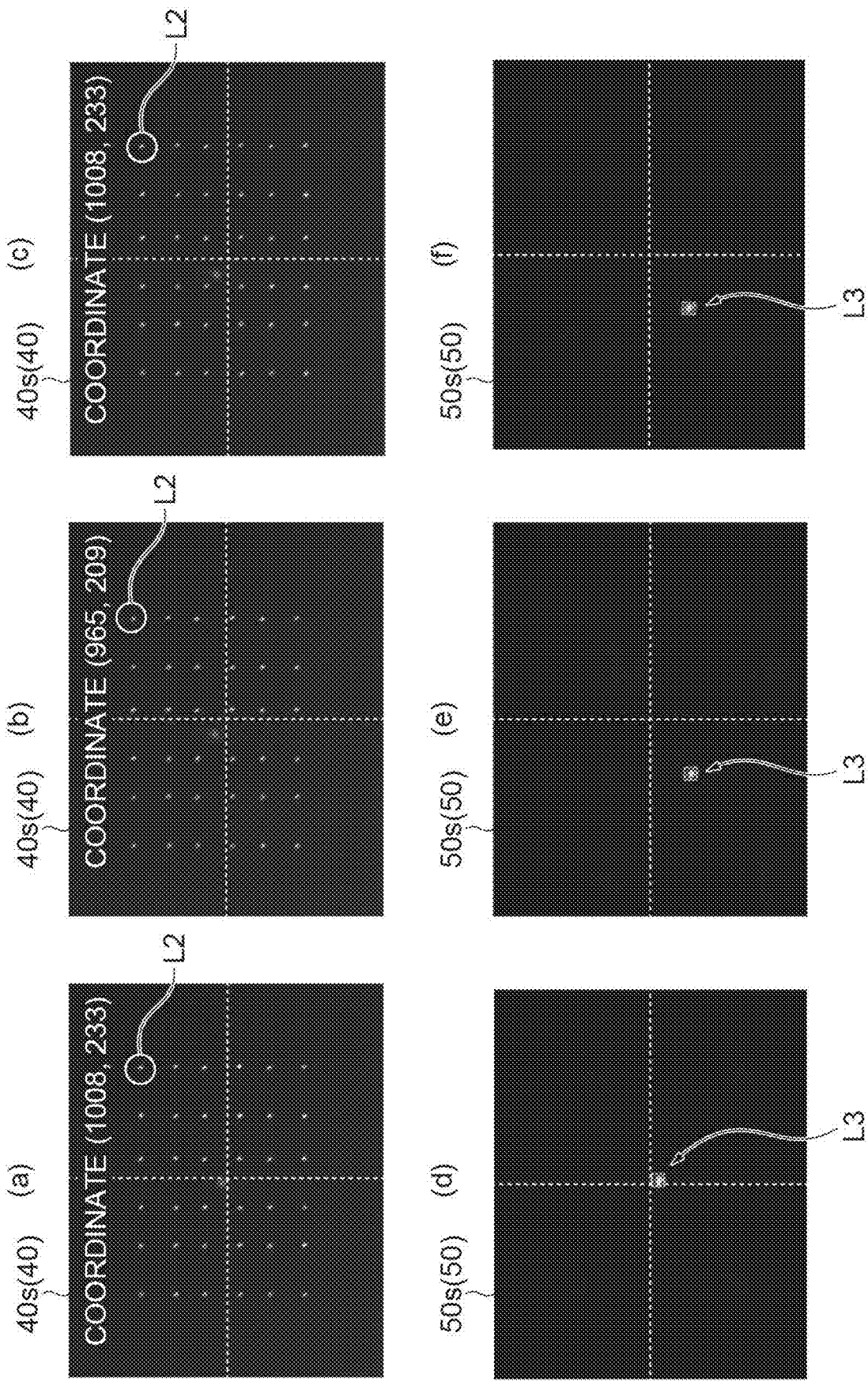
FIG. 15 is a diagram showing a state in which the control light is corrected.

Since the non-control light L3 is not subjected to the control for the spatial phase of the spatial phase modulator 21, in a case where the positional deviation occurs within the XY plane as shown in FIG. 15(e) from the initial state of FIG. 15(d), even if the CGH is displayed on the spatial phase modulator 21, the state of FIG. 15(e) is maintained as shown in FIG. 15(f).

After that, the control unit 60 determines whether or not to continue the above control (step S6). In a case where the result of determination in step S6 indicates that the control should not be continued, the process ends. On the other hand, in a case where the result of determination in step S6 indicates that the control should be continued, the process returns to step S1 to repeat the process.

As described above, the control unit 60 executes the correction process of controlling the phase control unit 20 to correct the control state for the spatial phase of the control light L2 in the phase control unit 20 on the basis of the detection result for the non-control light L3 from the second detector 50. More specifically, the control unit 60 executes a first correction process of controlling the phase control unit 20 to correct the positional deviation of the control light L2 within the plane intersecting with the optical axis direction of the control light L2 on the basis of the acquired first deviation amount. Further, the control unit 60 executes a second correction process of controlling the phase control unit 20 to correct the spread angle of the control light L2 on the basis of the acquired spread angle.

In particular, here, the phase control unit 20 includes the spatial phase modulator 21 that displays the phase modulation pattern (CGH) for diffracting the received laser light L1 to branch the laser light L1 into a plurality of rays of diffraction light and to emit the branched rays of diffraction light, emits 0th-order light of the laser light L1 as the non-control light L3, and emits another order diffraction light of the laser light L1 as the control light L2. Then, the control unit adjusts the phase modulation pattern displayed on the spatial phase modulator 21 on the basis of the detection result for the non-control light L3 to correct the control state for the spatial phase of the control light L2 in the phase control unit 20.

In each of the steps described above, the control unit 60 feedback-controls the phase control unit 20 to correct a change in a convergence state of the control light L2 derived from the laser light source 10 on the basis of the detection result of the second detector 50. On the other hand, in parallel with (or separately from) each of the above steps, the control unit 70 can execute the process of correcting a change in a convergence state of the control light L2 derived from something other than the laser light source 10 on the basis of the detection result of the first detector 40. For example, in a case where the control light L2 is branched into multiple points as described above, the control unit 70 can feedback-control the phase control unit 20 to make the intensity distribution of the points of the control light L2 uniform or to individually control the intensities of the points thereof on the basis of the detection result (the captured image) of the first detector 40. In this case, the CGH for the control of the control unit 70 only has to be superimposed on the CGH generated by the control unit 60 or the like.

As described above, in the laser processing device 100, a portion of the laser light L1 emitted from the laser light source 10 is controlled in the spatial phase by the phase control unit 20 to become the control light L2 and is used for the first optical system 30 to irradiate the object A. On the other hand, another portion of the laser light L1 emitted from the laser light source 10 converges toward the image capturing surface 50s of the second detector 50 as the non-control light L3 through the lens 80. As a result, the non-control light L3 not subjected to the control in the phase control unit 20 of the laser light L1 emitted from the laser light source 10 is detected. This non-control light L3 is less likely to be affected by the phase control unit 20 and maintains the characteristics of the laser light L1 when emitted from the laser light source 10. Therefore, the control unit 60 can easily correct the change in the convergence state of the laser light (the control light L2) caused by the laser light source 10 by controlling the phase control unit 20 to correct the control state for the spatial phase of the control light L2 in the phase control unit 20 on the basis of the detection result for this non-control light L3.

As a result, even in a case where the characteristics of the laser light L1 emitted from the laser light source 10 change due to aging, for example, the convergence state of the laser light L1 with which the object A is irradiated can be easily maintained at a specific initial value. Particularly, if the specific initial value is common among the plurality of laser processing devices 100 in a case where a plurality of laser processing devices 100 are used in parallel, the convergence state of the laser light L1 in each laser processing device 100 is maintained at the common initial value even in a case where the change in the convergence state of the laser light L1 emitted from the laser light source 10 varies for each laser processing device 100, and thus a machine difference is reduced. As a result, from the detection result of the first detector 40, when the control light L2 is branched into multiple points, it is possible to make the individual intensities uniform by a common processing method. In this way, since this laser processing device can reduce the machine difference, it is also effective in a case where the plurality of laser processing devices are used in parallel.

Further, in the laser processing device 100, the control unit 60 executes the first acquisition process of acquiring the first deviation amount which is the deviation amount of the position of the non-control light L3 within the plane intersecting with the optical axis direction of the non-control light L3 on the basis of the detection result of the second detector 50 and executes the first correction process of controlling the phase control unit 20 to correct the positional deviation of the control light L2 within the plane intersecting with the optical axis direction of the control light L2 on the basis of the first deviation amount. Therefore, it is possible to easily correct the positional deviation of the control light L2 within the plane intersecting with the optical axis direction on the basis of the information on the positional deviation of the non-control light L3 within the plane intersecting with the optical axis direction.

Further, in the laser processing device 100, the control unit 60 executes the second acquisition process of acquiring the spread angle of the non-control light L3 on the basis of the detection result of the second detector 50 and executes the second correction process of controlling the phase control unit 20 to correct the spread angle of the control light L2 on the basis of the spread angle of the non-control light L3. Therefore, it is possible to easily correct the change in the spread angle of the control light L2 on the basis of the information on the change amount in the spread angle of the non-control light L3.

Further, in the laser processing device 100, the control unit 60 drives the second detector 50 in the optical axis direction of the non-control light L3 while detecting the non-control light L3, acquires the second deviation amount which is the deviation amount of the position at which the non-control light L3 most converges on the image capturing surface 50s, from the initial position, and acquires the spread angle on the basis of the second deviation amount. Therefore, according to the mechanical driving of the second detector 50, it is possible to acquire the information on the change in the spread angle of the non-control light L3.

Further, in the laser processing device 100, the phase control unit includes the spatial phase modulator 21 that displays the phase modulation pattern for diffracting the received laser light L1 to branch the laser light L1 into a plurality of rays of diffraction light and to emit the branched rays of diffraction light, emits 0th-order light of the laser light L1 as the non-control light L3, and emits another order diffraction light of the laser light L1 as the control light L2. The control unit 60 adjusts the phase modulation pattern (CGH) displayed on the spatial phase modulator 21 on the basis of the detection result for the non-control light L3 to correct the control state for the spatial phase of the control light L2 in the phase control unit 20. In this way, in a case where the spatial phase modulator 21 is included and the laser light is branched into a plurality of rays by diffraction, while the 0th-order light that is not diffracted is suitably used as the non-control light, the change in the convergence state of the control light L2 can be easily corrected through the adjustment of the phase modulation pattern (the hologram) displayed on the liquid crystal layer.

The laser processing device 100 further includes the first detector for detecting the control light L2 emitted from the phase control unit 20. The control unit 70 generates the phase modulation pattern for adjusting the control state for the spatial phase of the control light L2 in the phase control unit 20 on the basis of the detection result of the control light L2 from the first detector 40 and causes the spatial phase modulator 21 to display the phase modulation pattern superimposed on the phase modulation pattern adjusted by the correction process. Therefore, the control state of the control light L2 can be adjusted in accordance with the change in the laser light (the control light L2) caused by something other than the laser light source 10 on the basis of the detection result of the control light L2.

The above embodiment describes an aspect of the present disclosure. Accordingly, the present disclosure is not limited to the aspect described above and may be arbitrarily modified. Subsequently, modification examples will be described.

Figure 16:
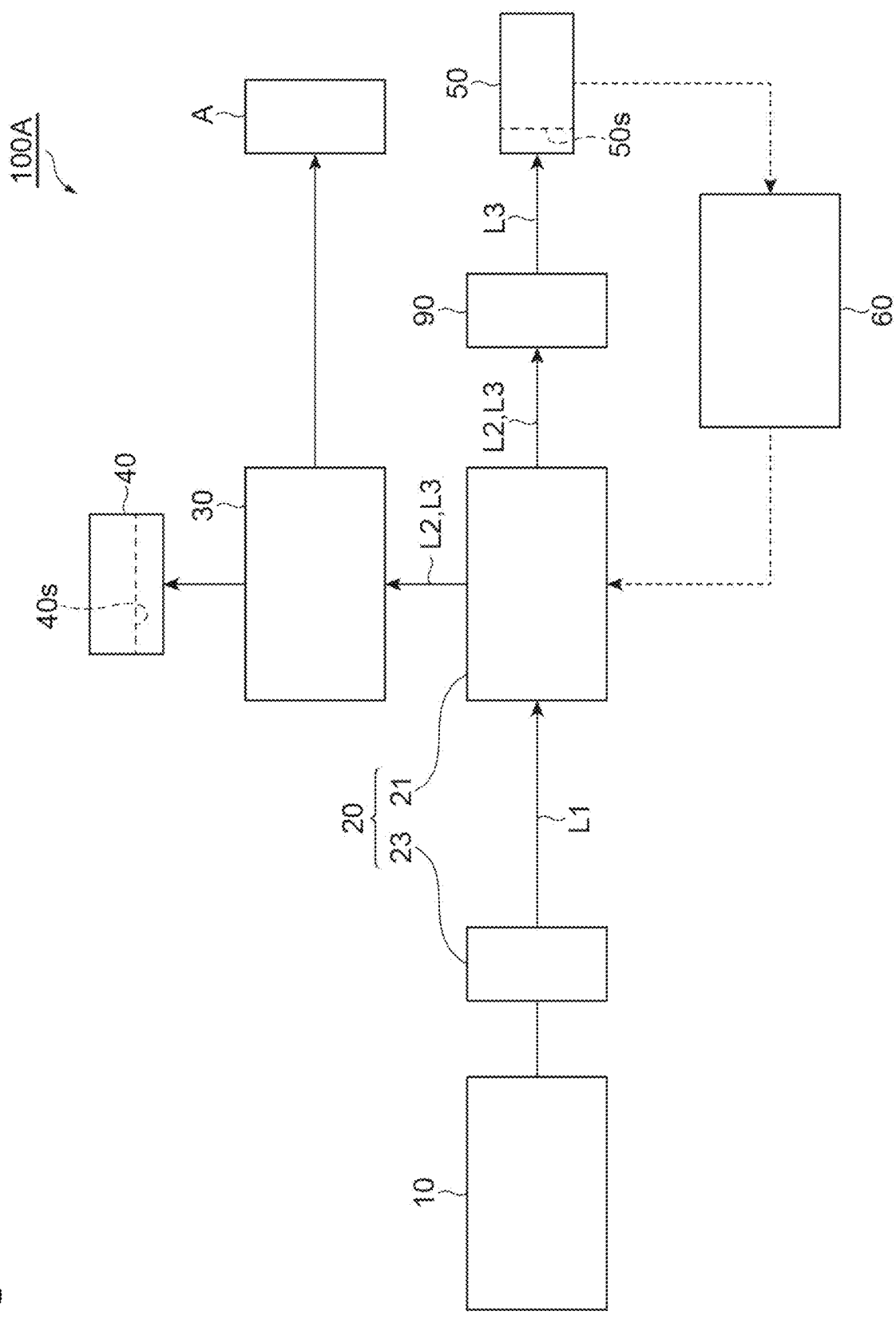
FIG. 16 is a block diagram of a laser processing device according to a modification example.
Figure 17:
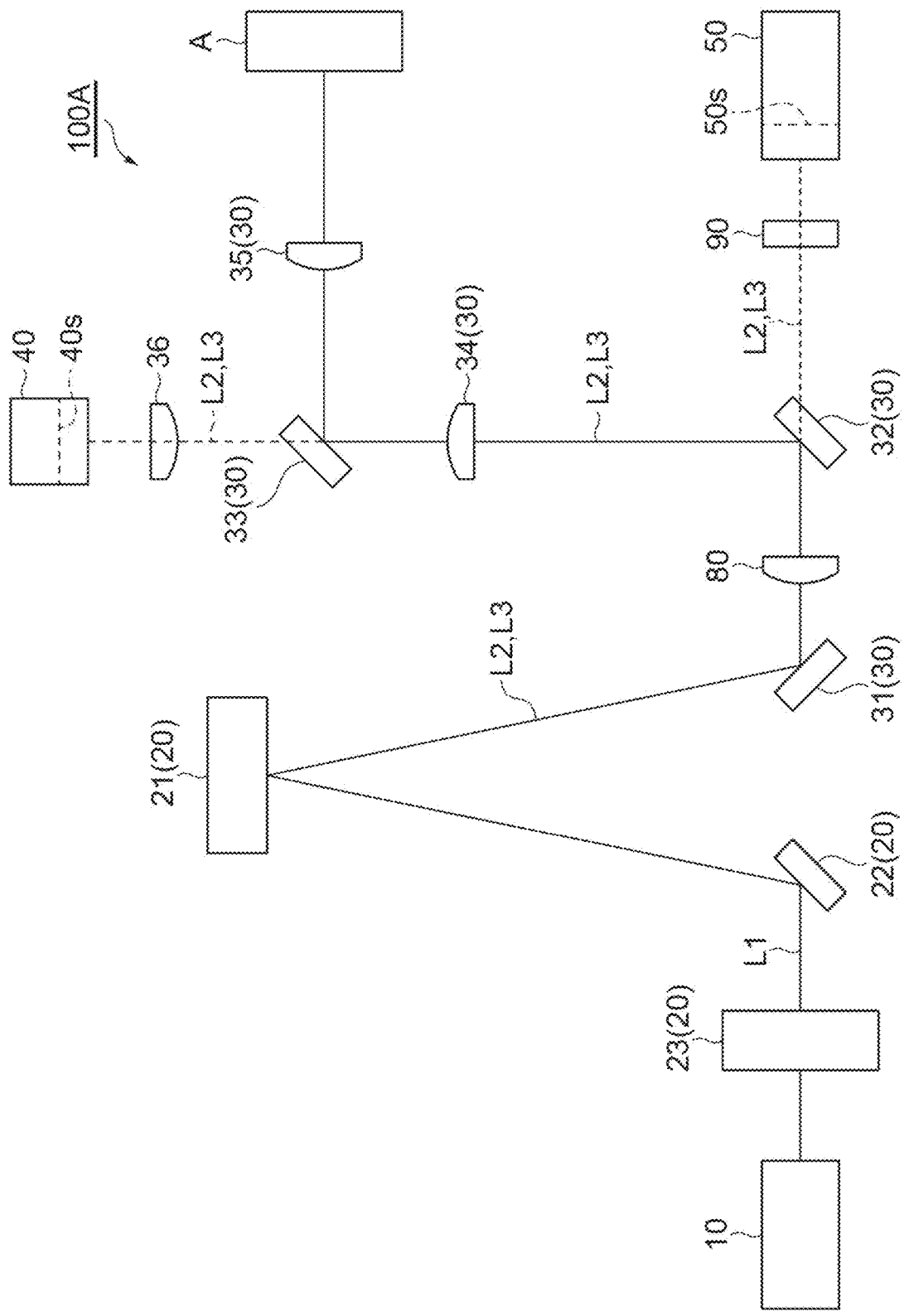
FIG. 17 is a schematic view of the laser processing device shown in FIG. 16.

FIG. 16 is a block diagram of a laser processing device according to a modification example. FIG. 17 is a schematic view of the laser processing device shown in FIG. 16. The laser processing device (a laser device) 100A shown in FIGS. 16 and 17 is different from the laser processing device 100 in that the phase control unit 20 further includes a polarization control element 23 and a polarizer 90 is provided in a preceding stage of the second detector 50 as compared with the laser processing device 100 according to the embodiment described above. The control unit 70 is omitted from the laser processing device 100A. Therefore, the functions of the control unit 70 described above are realized by the control unit 60. In this way, the control unit can be common.

The polarization control element 23 is interposed between the laser light source 10 and the spatial phase modulator 21 on the optical path of the laser light L1. The polarization control element 23 is, for example, a $\lambda/2$ wavelength plate and receives the laser light L1 emitted from the laser light source 10. Then, the polarization control element 23 changes a polarization direction of the laser light L1 such that the received laser light L1 includes an S-polarized component and a P-polarized component and emits the changed laser light L1.

Figure 18:
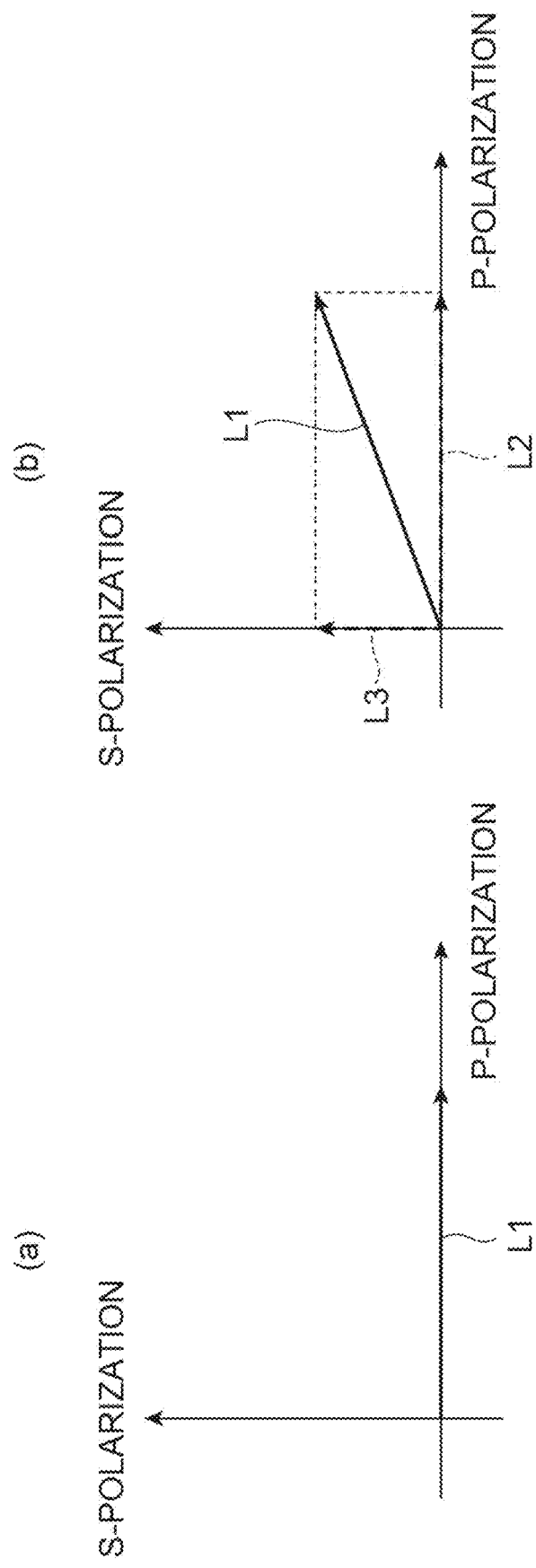
FIG. 18 is a graph for explaining a polarization direction of laser light.

From the viewpoint of increasing the utilization efficiency of the laser light L1 in the spatial phase modulator 21, as shown in FIG. 18(a), the polarization direction of the laser light L1 is changed to have only a polarized component that is sensitive to the liquid crystal layer of the spatial phase modulator 21. On the other hand, here, as shown in FIG. 18(b), the polarization direction of the laser light L1 is changed to include both the P-polarized component and the S-polarized component. Therefore, one of the P-polarized component and the S-polarized component (for example, the P-polarized component) of the laser light L1 is subjected to the control of the spatial phase in the spatial phase modulator 21 and becomes the control light L2, while the other of the P-polarized component and the S-polarized component (for example, the S-polarized component) of the laser light L1 is not subjected to the control of the spatial phase in the spatial phase modulator 21 and becomes the non-control light L3.

The polarizer 90 is interposed between the mirror 32 and the second detector 50 on the optical paths of the control light L2 and the non-control light L3. The polarizer 90 transmits only the other of the P-polarized component and the S-polarized component (for example, the S-polarized component). Therefore, in the laser processing device 100A, a portion of the control light L2 and the non-control light L3 emitted from the phase control unit 20 is transmitted through the mirror 32 and is incident on the polarizer 90, but only the non-control light L3 is transmitted through the polarizer 90 and is incident on the second detector 50. That is, here, the second detector 50 detects (captures an image of) only the non-control light L3.

In the laser processing device 100A configured as described above, similarly to the laser processing device 100, it is possible to control the phase control unit 20 in order to correct the control state for the spatial phase of the control light L2 in the phase control unit 20 on the basis of the detection result for the non-control light L3. Therefore, it is also possible for the laser processing device 100A to achieve the same operations and effects as the laser processing device 100.

Particularly, in the laser processing device 100, the phase control unit 20 includes the polarization control element 23 that changes the polarization direction of the laser light L1 such that the received laser light $L_1$ includes the S-polarized component and the P-polarized component and emits the changed laser light L1, and the spatial phase modulator 21 that controls the spatial phase of one of the S-polarized component and the P-polarized component of the laser light L1 emitted from the polarization control element 23 to emit the one controlled polarized component as the control light L2 and to emit the other of the S-polarized component and the P-polarized component of the laser light L1 as the non-control light L3. Then, the control unit 60 adjusts the phase modulation pattern displayed on the spatial phase modulator 21 on the basis of the detection result for the non-control light L3 to correct the control state for the spatial phase of the control light L2 in the phase control unit 20. Therefore, while the polarized component that is not sensitive to the liquid crystal layer is suitably used as the non-control light L3, the change in the convergence state of the control light L2 can be easily corrected through the adjustment of the phase modulation pattern (the hologram) displayed on the liquid crystal layer.

Furthermore, the laser processing device 100 may include a phase control unit 20A (see FIG. 19) using a diffractive optical element (DOE) 120 instead of the phase control unit 20 using the liquid crystal type spatial phase modulator 21.

Figure 19:
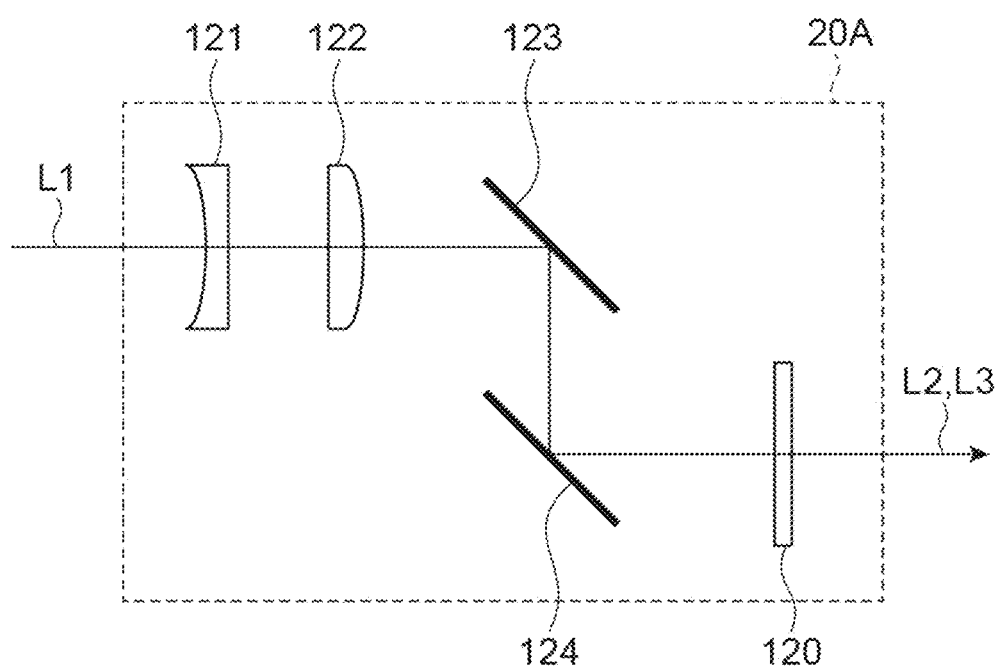
FIG. 19 is a schematic view of a phase control unit according to a modification example.

FIG. 19 is a schematic view of a phase control unit according to a modification example. As shown in FIG. 19, the phase control unit includes a diffractive optical element 120, a lens 121, a lens 122, a movable mirror 123, and a movable mirror 124. The lens 121, the lens 122, the movable mirror 123, and the movable mirror 124 are disposed on the optical path of the laser light L1 incident on the diffractive optical element 120 in this order.

The diffractive optical element 120 diffracts the incident laser light L1 to branch the laser light L1 into a plurality of rays of diffraction light and to emit the plurality of rays of diffraction light. The diffractive optical element 120 emits the 0th-order light of the laser light L1 as the non-control light L3 and emits another order diffraction light of the laser light L1 as the control light L2.

The movable mirror 123 is rotatable around an axis in the X-axis direction which is one direction that defines the XY plane, for example, and the movable mirror 124 is rotatable around an axis in the Y-axis direction which is another direction that defines the XY plane, for example. Therefore, in a case where the positional deviation of the non-control light L3 occurs within the XY plane (that is, in a case where Δx and Δy are acquired as the first deviation amount), the control unit 60 adjusts such that Δx and Δy become 0 by driving the movable mirror 123 and the movable mirror 124. As a result, the positional deviation of the control light L2 is corrected.

Further, the lens 121 and the lens 122 constitute, for example, a Galilean telescope. A magnification ration is expressed as –(focal length f2)/(focal length f1) using a focal length f1 of the lens 121 and a focal length f2 of the lens 122. Further, a distance d between the lens 121 and the lens 122 in the initial state is equal to the sum of the focal length f1 and the focal length f2. The lens 122 is movable in the optical axis direction. Therefore, in a case where the spread angle of the non-control light L3 changes (that is, in a case where the second deviation amount is acquired), the control unit 60 changes the position of the lens 122 in the optical axis direction to correct the spread angle of the control light L2.

That is, also in this modification example, the control unit 60 can execute the correction process of controlling the phase control unit 20A to correct the control state for the spatial phase of the control light L2 in the phase control unit 20A on the basis of the detection result for the non-control light L3 from the second detector 50. More specifically, the control unit 60 can execute the first correction process and the second correction process as in the above embodiment.

Figure 20:
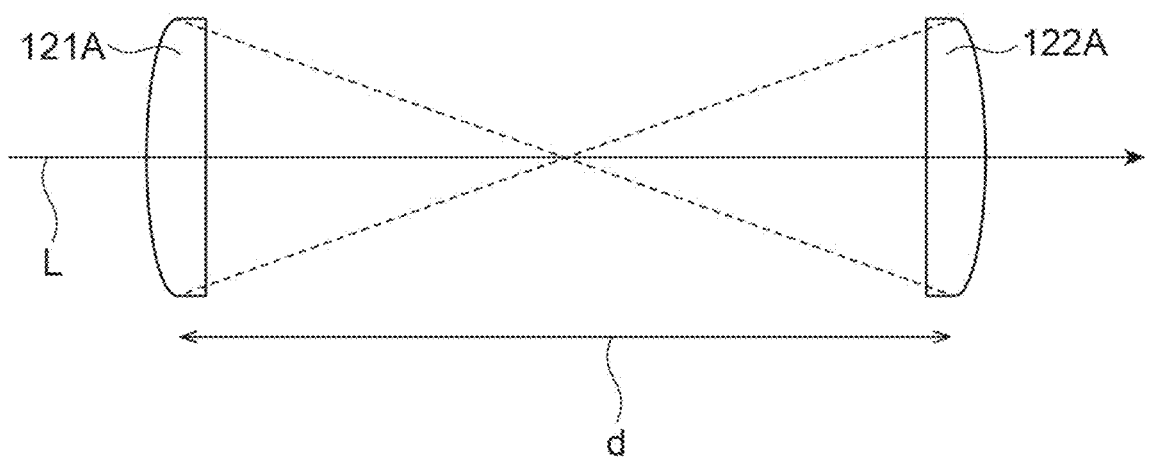
FIG. 20 is a view showing a modification example of the phase control unit shown in FIG. 19.

In the phase control unit 20A, lenses 121A and 122A forming a Keplerian telescope as shown in FIG. 20 may be employed instead of the lenses 121 and 122 forming the Galilean telescope. A magnification ration in this case is expressed as (focal length f2)/(focal length f1) using a focal length f1 of the lens 121A and a focal length C of the lens 122A. Further, a distance d between the lens 121 and the lens 122 in the initial state is equal to the sum of the focal length f1 and the focal length C.

Furthermore, in the above embodiments and modification examples, the laser processing device for processing the object A is exemplified. However, the present disclosure can also be applied to a laser device for purposes other than processing, such as a microscope.

INDUSTRIAL APPLICABILITY

It is possible to provide a laser device capable of easily correcting a change in a convergence state.

REFERENCE SIGNS LIST 100, 100A Laser processing device (laser device)
10 Laser light source
20 Phase control unit
21 Spatial phase modulator (liquid crystal type spatial phase modulator)
23 Polarization control element
30 First optical system
40 First detector (another detector)
50 Second detector (detector)
50s Image capturing surface (detection surface)

60, 70 Control unit
80 Lens (second optical system)

The invention claimed is:

1. A laser device comprising:
a laser light source configured to emit laser light;
a phase control unit configured to receive the laser light emitted from the laser light source, to control a spatial phase of a portion of the laser light, to emit the portion of the light as control light, and to emit another portion of the laser light as non-control light;
a first optical system configured to irradiate an object with the control light emitted from the phase control unit;
a detector configured to detect the non-control light emitted from the phase control unit;
a second optical system configured to cause the non-control light emitted from the phase control unit to converge toward a detection surface of the detector; and
a control unit configured to execute a correction process for controlling the phase control unit to correct a control state for a spatial phase of the control light in the phase control unit on the basis of a detection result for the non-control light from the detector.

2. The laser device according to claim 1, wherein the control unit executes
a first acquisition process of acquiring a first deviation amount, which is a deviation amount of a position of the non-control light within a plane intersecting with an optical axis direction of the non-control light, on the basis of the detection result, and
a first correction process, as the correction process, of controlling the phase control unit to correct positional deviation of the control light within a plane intersecting with an optical axis direction of the control light on the basis of the first deviation amount.

3. The laser device according to claim 1, wherein the control unit executes
a second acquisition process of acquiring a spread angle of the non-control light on the basis of the detection result, and
a second correction process, as the correction process, of controlling the phase control unit to correct a spread angle of the control light on the basis of the acquired spread angle.

4. The laser device according to claim 3, wherein, in the second acquisition process, the control unit drives the detector in the optical axis direction of the non-control light while detecting the non-control light, acquires a second deviation amount which is a deviation amount of a position at which the non-control light most converges on the detection surface, from an initial position, and acquires the spread angle on the basis of the second deviation amount.

5. The laser device according to claim 1,
wherein the phase control unit includes
a polarization control element configured to change a polarization direction of the laser light such that the received laser light includes an S-polarized component and a P-polarized component and to emit the changed laser light, and
a liquid crystal type spatial phase modulator configured to control a spatial phase of one of the S-polarized component and the P-polarized component of the laser light emitted from the polarization control element, to emit the one controlled polarized component as the control light, and to emit the other of the S-polarized component and the P-polarized component of the laser light as the non-control light, and
wherein, in the correction process, the control unit adjusts a phase modulation pattern displayed on the liquid crystal type spatial phase modulator on the basis of a detection result for the non-control light to correct a control state for a spatial phase of the control light in the phase control unit.

6. The laser device according to claim 1,
wherein the phase control unit includes a liquid crystal type spatial phase modulator that displays a phase modulation pattern for diffracting the received laser light to branch the laser light into a plurality of rays of diffraction light and to emit the branched rays of diffraction light, emits 0th-order light of the laser light as the non-control light, and emits another order diffraction light of the laser light as the control light, and
wherein, in the correction process, the control unit adjusts the phase modulation pattern displayed on the liquid crystal type spatial phase modulator on the basis of a detection result for the non-control light to correct a control state for a spatial phase of the control light in the phase control unit.

7. The laser device according to claim 5, further comprising:
another detector configured to detect the control light emitted from the phase control unit,
wherein the control unit generates a phase modulation pattern for adjusting a control state for a spatial phase of the control light in the phase control unit on the basis of a detection result of the control light from the other detector and causes the liquid crystal type spatial phase modulator to display the phase modulation pattern superimposed on the phase modulation pattern adjusted by the correction process.

* * * * *